(12) United States Patent
Tanabe et al.

(10) Patent No.: US 8,661,210 B2
(45) Date of Patent: Feb. 25, 2014

(54) DATA MIGRATION MANAGEMENT DEVICE AND METHOD

(75) Inventors: Kiyoshi Tanabe, Ebina (JP); Takaki Kuroda, Machida (JP)

(73) Assignee: Hitachi, Ltd., Tokyo (JP)

(*) Notice: Subject to any disclaimer, the term of this patent is extended or adjusted under 35 U.S.C. 154(b) by 0 days.

(21) Appl. No.: 13/589,252

(22) Filed: Aug. 20, 2012

(65) Prior Publication Data

US 2012/0324192 A1 Dec. 20, 2012

Related U.S. Application Data

(63) Continuation of application No. 11/968,253, filed on Jan. 2, 2008, now Pat. No. 8,261,031.

(30) Foreign Application Priority Data

Apr. 24, 2007 (JP) ................................. 2007-114244

(51) Int. Cl.
*G06F 12/16* (2006.01)

(52) U.S. Cl.
USPC .......................................... 711/161; 711/162

(58) Field of Classification Search
None
See application file for complete search history.

(56) References Cited

U.S. PATENT DOCUMENTS

| | | | |
|---|---|---|---|
| 7,174,425 B2 | 2/2007 | Kaneda et al. | |
| 2006/0047930 A1* | 3/2006 | Takahashi et al. | 711/162 |
| 2006/0053250 A1 | 3/2006 | Saze | |
| 2006/0143418 A1* | 6/2006 | Takahashi et al. | 711/165 |
| 2006/0155950 A1 | 7/2006 | Smith | |
| 2006/0224844 A1 | 10/2006 | Kano et al. | |
| 2006/0242376 A1 | 10/2006 | Tsuge et al. | |
| 2007/0113011 A1 | 5/2007 | Kaneda et al. | |
| 2007/0113041 A1 | 5/2007 | Sakashita et al. | |
| 2007/0250679 A1 | 10/2007 | Umemura et al. | |
| 2007/0255922 A1 | 11/2007 | Toume et al. | |
| 2008/0086608 A1* | 4/2008 | Kano | 711/162 |
| 2008/0270720 A1 | 10/2008 | Tanabe et al. | |

FOREIGN PATENT DOCUMENTS

| | | |
|---|---|---|
| EP | 0907123 | 4/1999 |
| JP | 2006099748 | 4/2006 |
| JP | 2006302077 | 11/2006 |

* cited by examiner

*Primary Examiner* — Than Nguyen
(74) *Attorney, Agent, or Firm* — Brundidge & Stanger, P.C.

(57) ABSTRACT

A management device and management method capable of improving usability of a storage system is proposed. The management device and the management method for managing data migration between volumes in a storage system in which normal volumes to which fixed storage areas are allocated in advance and virtual volumes to which storage areas are dynamically allocated according to use status coexist as types of volumes for reading and writing data is arranged so that information regarding each volume is collected, and based on the collected information, at least a total logical capacity that is a summation of logical capacities determined in advance for the respective volume is separately displayed for normal volumes and virtual volumes.

14 Claims, 27 Drawing Sheets

FIG.4

| VOLUME NAME | LOGICAL CAPACITY | VOLUME TYPE | VOLUME CHASSIS | STORAGE NAME | VIRTUAL POOL NAME | OCCUPIED CAPACITY | DATA QUANTITY | VOLUME RESERVATION STATUS |
|---|---|---|---|---|---|---|---|---|
| NV1 | 1GB | NORMAL | INTERNAL | Storage1 |  | 1GB | 100KB | USED |
| VV1 | 1GB | VIRTUAL | INTERNAL | Storage1 | VP1 | 100GB | 98GB | USED |
| NV11 | 1GB | NORMAL | EXTERNAL | Storage2 |  | 1GB | 0 | RESERVED |
| VV21 | 1GB | VIRTUAL | EXTERNAL | Storage2 | VP2 | 0 | 0 | RESERVED |
| NV21 | 2GB | NORMAL | INTERNAL | Storage1 |  | 2GB | 0 | UNUSED |
| ... |  |  |  |  |  |  |  |  |

| RETRIEVING CONDITION NAME | VOLUME INFORMATION | LOGICAL CONDITION | CONDITION VALUE | COUPLED CONDITION |
|---|---|---|---|---|
| RETRIEVING CONDITION 1 | STORAGE NAME | = | Storage1 | AND |
| RETRIEVING CONDITION 1 | LOGICAL CAPACITY | < | 10GB | AND |
| RETRIEVING CONDITION 1 | VOLUME CHASSIS | = | EXTERNAL VOLUME | AND |
| RETRIEVING CONDITION 1 | VOLUME TYPE | = | VIRTUAL VOLUME | AND |
| ... | | | | |
| 31A | 31B | 31C | 31D | 31E |

| MIGRATION GROUP NAME | VOLUME NAME |
|---|---|
| MG1 | NV1 |
| MG1 | NV2 |
| MG2 | VV1 |
| MG2 | NV3 |
| ... | |
| 32A | 32B |

| TIER NAME | VOLUME RETRIEVING CONDITION NAME |
|---|---|
| Tier1 | RETRIEVING CONDITION 1 |
| Tier2 | RETRIEVING CONDITION 2 |
| Tier3 | RETRIEVING CONDITION 3 |
| ... | |
| 33A | 33B |

| MIGRATION PLAN NAME | MIGRATION GROUP NAME | TIER NAME | MIGRATION PERFORMANCE STATUS | PRESENCE/ ABSENCE OF TEMPORARY MIGRATION | MIGRATION EXECUTION SPECIFIED TIME |
|---|---|---|---|---|---|
| MP1 | MG1 | Tier1 | PERFORMED | ABSENT | |
| MP2 | MG2 | Tier2 | PERFORMED | PRESENT | 2007/02/20 0:00 |
| MP3 | MG3 | Tier3 | NOT PERFORMED | PRESENT | |
| ... | | | | | |
| 34A | 34B | 34C | 34D | 34E | 34F |

| MIGRATION PLAN NAME | MIGRATION SOURCE VOLUME NAME | MIGRATION DESTINATION VOLUME NAME | TEMPORARY MIGRATION |
|---|---|---|---|
| MP1 | NV1 | NV11 | NO |
| MP1 | NV2 | NV12 | NO |
| MP2 | VV1 | NV21 | YES |
| ... | | | |
| 35A | 35B | 35C | 35D |

| VOLUME NAME | ATTRIBUTE NAME | TEMPORARY VOLUME ATTRIBUTE VALUE | ULTIMATE VOLUME ATTRIBUTE VALUE |
|---|---|---|---|
| NV2 | VOLUME TYPE | VIRTUAL VOLUME | NORMAL VOLUME |
| VV2 | VOLUME TYPE | NORMAL VOLUME | VIRTUAL VOLUME |
| ... | | | |
| 36A | 36B | 36C | 36D |

| TIER NAME | CREATION WAITING ATTRIBUTE 37B | | | MIGRATION GROUP NAME | VOLUME NAME |
|---|---|---|---|---|---|
| | LOGICAL CAPACITY | VOLUME ATTRIBUTE | ... | | |
| Tier1 | 50GB | NORMAL VOLUME | | MG2 | NV2 |
| Tier2 | 100GB | VIRTUAL VOLUME | | MG4 | VV4 |
| ... | | | | | |

| VIRTUAL POOL NAME | LOGICAL CAPACITY | VIRTUAL POOL FREE SPACE |
|---|---|---|
| VP1 | 100TB | 10TB |
| VP2 | 200TB | 150TB |
| ... | | |

38A  38B  38C

38

| SUMMARY | | | |
|---|---|---|---|
| NAME | MP1 | | |
| MIGRATION GROUP NAME | TIER NAME | MIGRATION PERFORMANCE STATUS | ... |
| MG1 | Tier1 | NOT PERFORMED  [EXECUTE] | |

| SUMMARY | | | |
|---|---|---|---|
| NAME | MG·xxx | | |
| NORMAL VOLUME | | VIRTUAL VOLUME | |
| TOTAL LOGICAL CAPACITY | 2TB | TOTAL LOGICAL CAPACITY | 100TB |
| TOTAL OCCUPIED CAPACITY ON STORAGE | 2TB | TOTAL OCCUPIED CAPACITY ON STORAGE | 7TB |
| DATA QUANTITY BY FS ETC. | 1.5TB | DATA QUANTITY BY FS ETC. | 5TB |

FIG.24

| SUMMARY | | | |
|---|---|---|---|
| NAME | Tier·xxx | | |
| NORMAL VOLUME | | VIRTUAL VOLUME | |
| TOTAL LOGICAL CAPACITY | 10TB | TOTAL LOGICAL CAPACITY | 100TB |
| TOTAL LOGICAL CAPACITY OF UNUSED VOLUME | 3TB | FREE SPACE OF VIRTUAL POOL | 8TB |
| DATA QUANTITY BY FS ETC. | 1.5TB | DATA QUANTITY BY FS ETC. | 5TB |

FIG.30

| NUMBER | VOLUME NAME | LOGICAL CAPACITY | OCCUPIED CAPACITY ON STORAGE | OCCUPANCY RATIO | EVALUATION VALUE | MIGRATION DESTINATION VOLUME TYPE |
|---|---|---|---|---|---|---|
| 1 | VV1 | 50GB | 10GB | 20% | 40GB | NV |
| 2 | VV2 | 50GB | 45GB | 90% | 5GB | NV |
| 3 | VV3 | 50GB | 35GB | 70% | 15GB | NV |
| 4 | VV4 | 250GB | 200GB | 80% | 50GB | VV |
| 5 | VV5 | 250GB | 225GB | 90% | 25GB | NV |
| 6 | VV6 | 250GB | 125GB | 50% | 125GB | VV |
| 7 | VV7 | 1TB | 700GB | 70% | 300GB | VV |
| 8 | VV8 | 1TB | 500GB | 50% | 500GB | VV |
| 9 | VV9 | 1TB | 250GB | 25% | 750GB | VV |
| 80A | 80B | 80C | 80D | 80E | 80F | 80G |

| NUMBER | VOLUME NAME | LOGICAL CAPACITY | OCCUPIED CAPACITY ON STORAGE | OCCUPANCY RATIO | EVALUATION VALUE | MIGRATION DESTINATION VOLUME NAME |
|---|---|---|---|---|---|---|
| 1 | VP1 | 560GB | 550GB | 98% | - | |
| 2 | VV1 | 250GB | 125GB | 50% | 125GB | - |
| 3 | VV2 | 250GB | 225GB | 90% | 25GB | NV2 |
| 4 | VV3 | 250GB | 200GB | 80% | 50GB | NV1 |

DATA MIGRATION MANAGEMENT DEVICE AND METHOD

CROSS REFERENCE TO RELATED APPLICATIONS

The present application is a continuation of application Ser. No. 11/968,253, filed Jan. 2, 2008, now U.S. Pat. No. 8,261,031; which relates to and claims priority from Japanese Patent Application No. 2007-114244, filed on Apr. 24, 2007, the entire disclosures of which are incorporated herein by reference.

BACKGROUND OF THE INVENTION

The present invention relates to a management device and a management method, and is suitably applicable to, for instance, a storage system.

Conventionally, a user of a storage system calculates a fixed logical capacity of a volume to be used by the user, and creates and utilizes a volume to which is allocated a storage area equivalent to the logical capacity. This requires a user to prepare in advance a storage corresponding to a logical capacity in anticipation of future changes in business operations, despite the fact that the logical capacity will not be initially used. In the following description, such a volume to which a fixed storage area is allocated in advance shall be referred to as a normal volume.

On the other hand, a virtualized volume function has been proposed in recent years as a function of storage devices. The virtualized volume function is a function that presents a virtualized volume (hereinafter referred to as a virtual volume) to a host device as a volume to be used by a user to read and write data, and which dynamically allocates on the virtual volume a storage area for storing data according to the use status of the virtual volume. According to such a virtualized volume function, since it will suffice to sequentially purchase additional storages corresponding to required logic capacities, effective use of the storage resources in the storage device may be achieved.

However, since a user consciously uses the respective volumes separately from each other, normal volumes and virtual volumes will coexist in a storage system that includes a storage device having a virtual volume function.

Cases where a user selects a virtual volume may include a case where the user would like to configure in advance a volume with a large capacity because the user does not wish to reallocate a volume by sudden writing even though the logical capacity required by business operations is not known in advance.

Meanwhile, cases where a user selects a normal volume may include a case where an essential logical capacity for business operations is known in advance or a case of preventing the occurrence of a state where a necessary capacity cannot be allocated due to a depletion of free space of an aggregate (hereinafter referred to as a virtual pool) of an original volume that allocates storage area to a virtual volume.

In addition, since a virtual volume requires mapping management between a logic volume and a physical volume, its performance is inferior to that of a normal volume. Therefore, a normal volume is also selected for cases where high efficiency of data input and output is required. Furthermore, with the virtualized volume function, a plurality of virtual volumes shares a virtual pool and physical volumes. As a result, there is a disadvantage in that a failure of a physical volume may affect a plurality of virtual volumes. Thus, there are cases where a normal volume is selected from the perspective of maintainability.

As seen, a user uses both normal volumes and virtual volumes based on applications, characteristics and the like, and a change in application may result in data migration performed from a normal volume to a virtual volume or vice versa. Various techniques regarding migration of data stored in volumes have been proposed by the present inventors (Japanese Patent Laid-Open No. 2006-099748, Japanese Patent Laid-Open No. 2006-302077).

SUMMARY OF THE INVENTION

A conventional storage system in which normal volumes and virtual volumes coexist has a problem of inferior usability in that various volume-related information are not separately displayed for normal volumes and virtual volumes, making it impossible to make appropriate decisions when, for instance, selecting a data migration destination.

The present invention has been made in consideration of the above problems, and an object thereof is to propose a management device and a management method capable of improving the usability of storage systems.

In order to solve the above-described problems, a management device that manages, in a storage system in which normal volumes to which fixed storage areas are allocated in advance and virtual volumes to which storage areas are dynamically allocated according to use status coexist as types of volumes for reading and writing data, data migration between the volumes, wherein the management device includes: a display unit that displays information; and a control unit that collects information regarding the volumes, and based on the collected information, causes the display unit to separately display for the normal volumes and the virtual volumes, at least a total logical capacity that is a summation of logical capacities determined in advance for the volumes.

In addition, according to the present invention, a management method for managing, in a storage system in which normal volumes to which fixed storage areas are allocated in advance and virtual volumes to which storage areas are dynamically allocated according to use status coexist as types of volumes for reading and writing data, data migration between the volumes, where in the management method includes: a first step for collecting information regarding the volumes, and a second step for separately displaying, based on the collected information, for the normal volumes and the virtual volumes, at least a total logical capacity that is a summation of logical capacities determined in advance for the volumes.

According to the present invention, since a user will be able to determine a migration destination of data stored in a normal volume or a virtual volume based on respective total logical capacities of displayed normal volumes and virtual volumes, the usability of a storage system may be improved.

Other aspects and advantages of the invention will be apparent from the following description and the appended claims.

BRIEF DESCRIPTION OF DRAWINGS

FIG. 4 is a conceptual diagram for explaining a volume information management table;

FIG. 5 is a conceptual diagram for explaining a volume retrieving condition management table;

FIG. 6 is a conceptual diagram for explaining a migration group volume list management table;

FIG. 7 is a conceptual diagram for explaining a tier condition management table;

FIG. 8 is a conceptual diagram for explaining a migration management table;

FIG. 9 is a conceptual diagram for explaining a migration volume management table;

FIG. 10 is a conceptual diagram for explaining a migration volume temporary table;

FIG. 11 is a conceptual diagram for explaining a volume creation waiting table;

FIG. 12 is a conceptual diagram for explaining a virtual pool management table;

FIG. 23 is a schematic diagram for explaining a migration group summary;

FIG. 24 is a schematic diagram for explaining a tier summary;

FIG. 30 is a schematic diagram showing a migration pair evaluation screen;

FIG. 32 is a schematic diagram showing a migration pair evaluation screen that is displayed with respect to a virtual pool capacity depletion prevention function;

DETAILED DESCRIPTION OF THE DRAWINGS

An embodiment of the present invention will now be described in detail with reference to the drawings.

(1) Configuration of a Storage System According to the Present Embodiment

Figure 1:
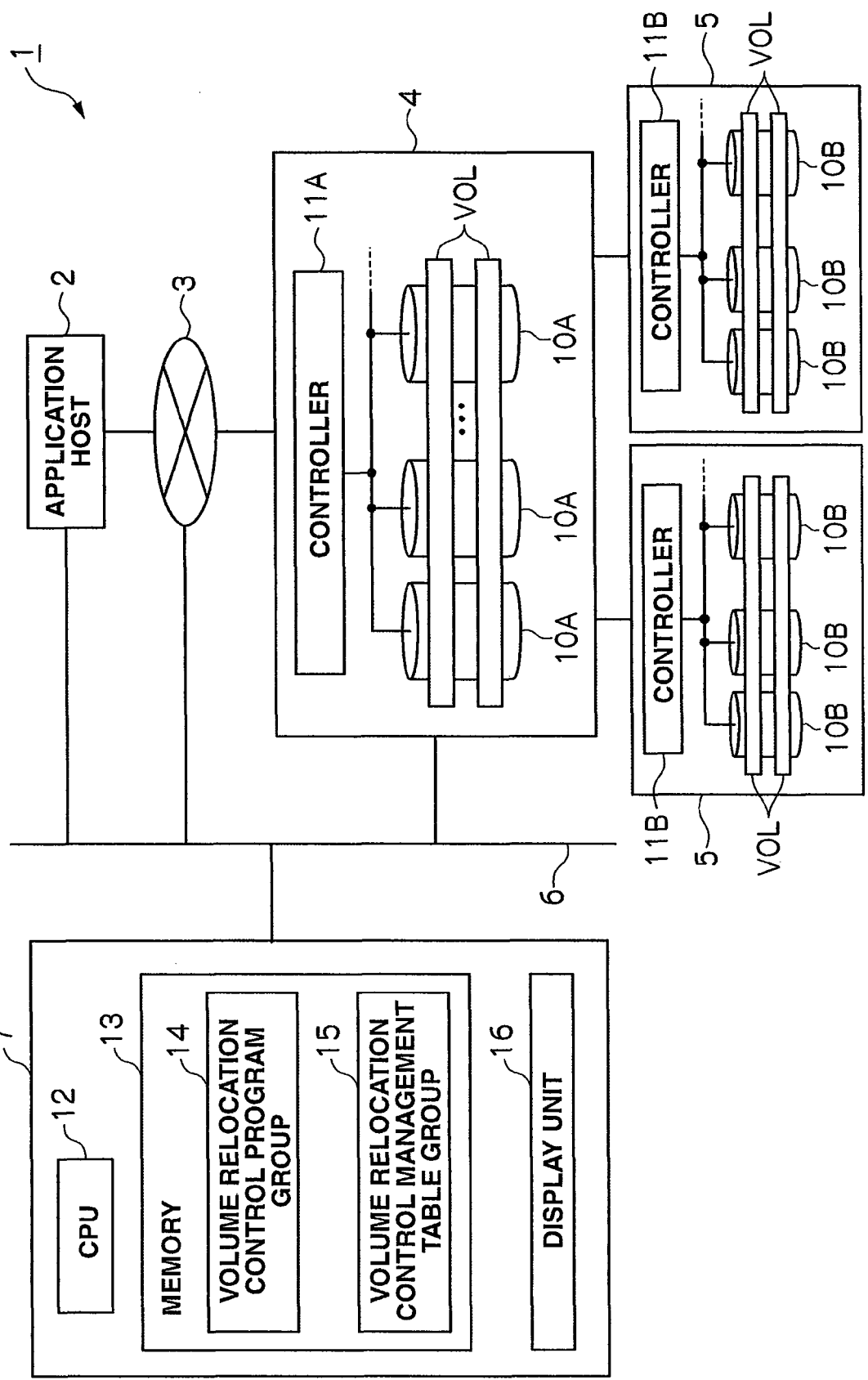
FIG. 1 is a block diagram showing an overall configuration of a storage system according to an embodiment.

In FIG. 1, reference numeral 1 denotes an entire storage system according to the present embodiment. In the storage system 1, an internal storage device 4 is connected to an application host 2 via a first network 3 that is composed of a SAN (Storage Area Network) or the like. A plurality of external storage devices 5 are connected to the internal storage device 4. In addition, the application host 2, the first network 3, the internal storage device 4 and the external storage devices 5 are connected to a management server 7 via a second network 6 that is composed of a LAN (Local Area Network) or the like.

The application host 2 is a computer device that executes various business applications, and is provided with hardware resources such as a CPU (Central Processing Unit), a memory and the like. The application host 2 executes various processing as an entire unit by having the CPU execute various control programs stored in a memory.

The internal storage device 4 and the external storage devices 5 include a plurality of storage devices 10A and 10B, and controllers 11A and 11B which control these storage devices 10A and 10B.

The storage devices 10A and 10B include expensive disk drives such as FC (Fibre Channel) disks, inexpensive disk drives such as SATA (Serial AT Attachment) disks or optical disk drives, semiconductor memories or the like. A predetermined number (for instance, four) of storage devices 10A and 10B configure a single RAID (Redundant Array of Inexpensive Disks) group. One or more logical volumes VOL are defined on a storage area provided by the respective storage devices 10A and 10B which configure a single RAID group. Read/write of data from the application host 2 is performed on the volume VOL in units of a block having a predetermined size.

A unique identifier (LUN: Logical Unit Number) is respectively assigned to each volume VOL. In the present embodiment, data input/output is performed by specifying an address that is a combination of this identifier and a block-unique number (LBA: Logical Block Address) that is respectively assigned to each block.

The controllers 11A and 11B are provided with hardware resources such as CPUs and memories. In response to a request from the application host 2 (in the case of the internal storage device 4) or the internal storage device 4 (in the case of the external storage devices 5), the controllers 11A and 11B perform control processing for reading/writing of specified data to an normal volume or a virtual volume in the internal storage device 4 or the external storage devices 5.

The management server 7 includes a CPU 12, a memory 13, a display unit 16 consisting of a CRT (Cathode-Ray Tube) or a liquid crystal panel, and an input device consisting of a mouse, keyboard or the like. The CPU 12 is a processor that governs operation control of the entire management server 7, and executes necessary processing according to various control programs stored in the memory 13. The memory 13 is primarily used for storing control programs and control parameters. A volume relocation control program group 14 and a volume relocation control management table group 15, which will be described later, are also stored in the memory 13.

(2) Data Migration Function According to the Present Embodiment (2-1) Configuration of Volume Relocation Control Program Group and Volume Relocation Control Management Table Group The storage system 1 according to the present embodiment enables a user that is a system administrator to respectively create a volume group (hereinafter referred to as a migration group) which is an aggregate of volumes that are the data migration source and a volume group (hereinafter referred to as a tier) which is an aggregate of volumes that is the data migration destination using the management server 7.

In addition, the storage system 1 enables the creation of a plan (hereinafter referred to a migration plan) that outlines which volume in a tier should data that is respectively stored in the volumes in the created migration group migrate to, and is able to execute data migration according to the created migration plan. Hereinafter, in a migration plan, a pair formed by a volume in a migration group and a volume in a tier respectively set as a data migration source and data migration destination shall be referred to as a migration pair.

As a means of realizing such a migration function, the volume relocation control program group 14 and the volume relocation control management table group 15 as described above are stored in the memory 13 of the management memory 7.

Figure 2:
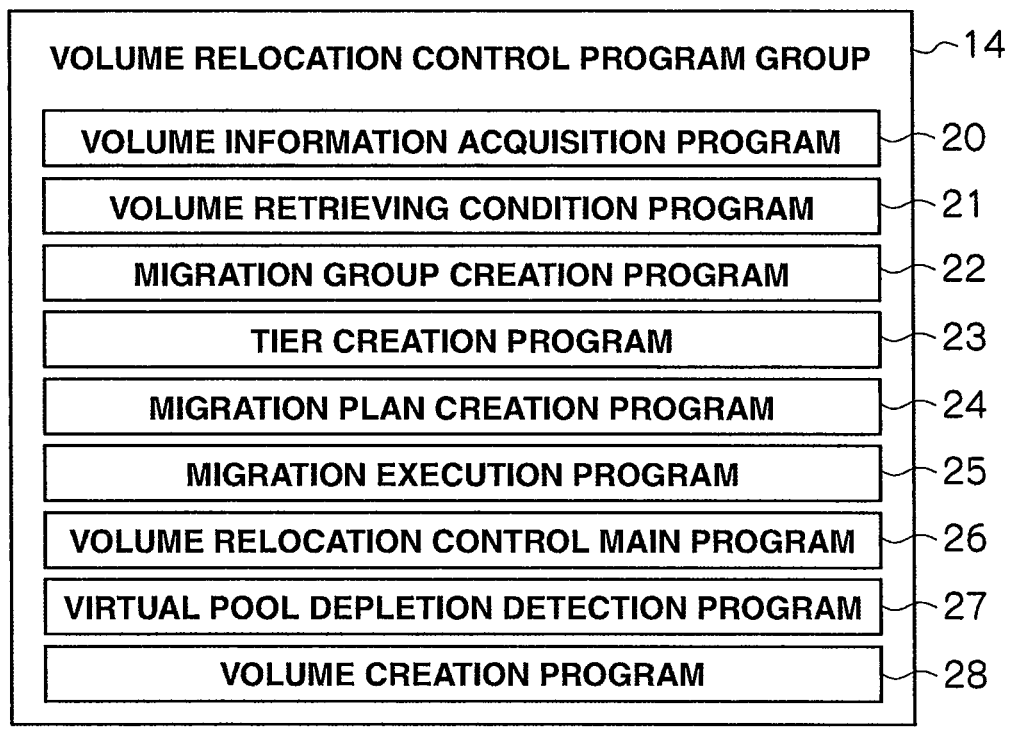
FIG. 2 is a conceptual diagram showing a configuration of a volume relocation control program group.

As shown in FIG. 2, the volume relocation control program group 14 includes: a volume information acquisition program 20, a volume retrieving condition program 21, a migration group creation program 22, a tier creation program 23, a migration plan creation program 24, a migration execution program 25, a volume relocation control main program 26, a virtual pool depletion detection program 27 and a volume creation program 28.

The volume information acquisition program 20 is a program for having the management server 7 acquire various information regarding volumes created within the internal storage device 4 or the external storage devices 5 from these storage devices via the second network 6. The volume retrieving condition program 21 is a program for creating and managing conditions for retrieving a desired volume from these volumes in response to user operations, while the migration group creation program 22 and the tier creation program 23 are programs for creating a migration group or a tier in response to requests from the user.

The migration plan creation program 24 is a program for creating a migration plan in response to a request by the user, while the migration execution program 25 is a program for controlling the internal storage device 4 or the external storage devices 5 in order to execute data migration according to the specified migration plan.

The virtual pool depletion detection program 27 is a program for checking the free space of the virtual pools in the internal storage device 4 and the external storage devices 5, and for a virtual pool in which free space is being depleted, migrates data stored in that virtual pool to a normal volume or the like. The volume creation program 28 is a program for creating a data destination volume when the same does not exist during data migration.

Figure 3:
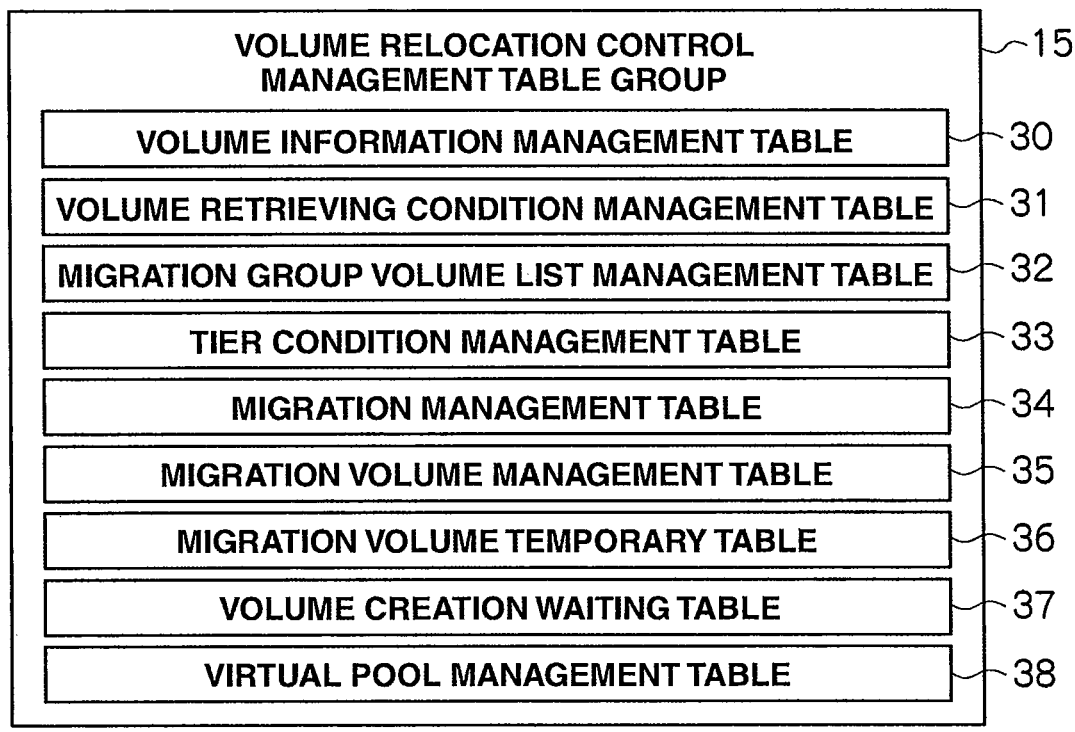
FIG. 3 is a conceptual diagram showing a configuration of a volume relocation control management table group.

On the other hand, as shown in FIG. 3, the volume relocation control management table group 15 includes: a volume information management table 30, a volume retrieving condition management table 31, a migration group volume list management table 32, a tier condition management table 33, a migration management table 34, a migration volume management table 35, a migration volume temporary table 36, a volume creation waiting table 37 and a virtual pool management table 38.

The volume information management table 30 is a table for managing information on the respective volumes in the internal storage device 4 or the external storage devices 5 from these storage devices according to the volume information acquisition program 20.

As shown in FIG. 4, the volume information management table 30 includes: a "volume name" field 30A, a "logical capacity" field 30B, a "volume type" field 30C, a "volume chassis" field 30D, a "storage name" field 30E, a "virtual pool name" field 30F, an "occupied capacity" field 30G, a "data quantity" field 30H and a "volume reservation status" field 30I.

A corresponding volume name, logical capacity, volume type ("normal" for a normal volume, "virtual" for a virtual volume: to be repeated hereunder), type of storage device in which the volume is provided ("internal" for the internal storage device 4" and "external" for the external storage devices 5: to be repeated hereunder), and a name of the storage device are respectively stored in the "volume name" field 30A, the "logical capacity" field 30B, the "volume type" field 30C, the "volume chassis" field 30D and the "storage name" field 30E.

When the volume is a virtual volume, the name of a virtual pool on which the volume is mapped is stored in the "virtual pool name" field 30F. When the volume is a normal volume, a capacity allocated to the volume is stored in the "occupied capacity" field 30G, and when the volume is a virtual volume, a capacity that is actually in use as the occupied capacity of the volume is stored therein.

A quantity of data stored in the volume by a file system and the like is stored in the "data quantity" field 30H. A reservation status ("used" when in use, "unused" when not in use, "reserved" when reserved as a data migration destination: to be repeated hereunder) is stored in the "volume reservation status" field 30I.

Therefore, for instance, FIG. 4 shows that the volume denoted as "NV1" is a normal volume having a logical capacity of "1 GB" which is provided in the internal storage device 4 denoted as "Storage 1", is already "used", and that the data capacity of currently stored data is "100 KB".

The volume retrieving condition management table 31 is a table for managing conditions for retrieving volumes (hereinafter simply referred to as volume retrieving conditions) created by the user according to the above-described volume retrieving condition program 21. As shown in FIG. 5, the volume retrieving condition management table 31 includes: a "retrieving condition name" field 31A, a "volume information" field 31B, a "logical condition" field 31C, a "condition value" field 31D and a "coupled condition" field 31E.

A name of a corresponding retrieving condition is stored in the "retrieving condition name" field 31A, while names of items of volume information used as conditions ("storage name", "logical capacity", "volume type" or the like) are stored in the "volume information" field 31B. In addition, a logical condition corresponding to the volume information item is stored in the "logical condition" field 31C, while a condition value of the volume information item is stored in the "condition value" field 31D. Furthermore, a coupled condition ("AND" or "OR") of the condition on the present row and a condition on another row is stored in the "coupled condition" field 31E.

Accordingly, FIG. 5 shows that a retrieving condition 1 sets as retrieval targets volumes that are "external volumes" provided in a storage device (the internal storage device 4)

denoted as "Storage 1" which, at the same time, are volumes that are "virtual volumes" having logical capacities smaller than "10 GB".

The migration group volume list management table 32 is a table for managing volumes respectively belonging to each migration group created by the user according to the migration group creation program 22, and as shown in FIG. 6, includes a "migration group name" field 32A and a "volume name" field 32B.

The name of each migration group created by the user is stored in the "migration group name" field 32A, while names of the respective volumes belonging to the migration groups are stored in the "volume name" field 32B. Accordingly, FIG. 6 shows that at least volumes denoted as "NV1" and "NV2" belong to a migration group denoted as "MG1".

The tier condition management table 33 is table for managing volume retrieving conditions respectively set for each tier, and as shown in FIG. 7, includes a "tier name" field 33A and a "volume retrieving condition name" field 33B.

The name of each tier created by the user is stored in the "tier name" field 33A, while the name of a retrieving condition set by the user for a tier is stored in the "volume retrieving condition name" field 33B. Accordingly, the example shown in FIG. 7 depicts that a retrieving condition denoted as "retrieving condition 1" is set for a tier denoted as "Tier 1" while a retrieving condition denoted as "retrieving condition 2" is set for a tier denoted as "Tier 2".

The migration management table 34 is a table for managing the presence/absence of execution of data migration according to a migration plan. As shown in FIG. 8, the migration management table 34 includes: a "migration plan name" field 34A, a "migration group name" field 34B, a "tier name" field 34C, a "migration performance status" field 34D, a "presence/absence of temporary migration" field 34E and a "migration execution specified time" field 34F.

The name of a corresponding migration plan is stored in the "migration plan name" field 34A, while the name of a migration group set as the data migration source in the migration plan is stored in the "migration group name" field 34B. In addition, the name of a tier set as the data migration destination in the migration plan is stored in the "tier name" field 34C, while information indicating whether data migration according to the migration plan has been executed is stored in the "migration performance status" field 34D.

Furthermore, information indicating whether a migration pair that temporarily migrates or has temporarily migrated data to a volume of a different volume type exists is stored in the "presence/absence of temporary migration" field 34E, while the point in time at which data migration specified by the user should be executed (hereinafter referred to as the migration execution specified time) is stored in the "migration execution specified time" field 34F.

Accordingly, FIG. 8 shows that a migration plan denoted as "MP2" has a migration group denoted as "MP2" as the data migration source and a tier denoted as "Tier 2" as a data migration destination and a migration pair exists that temporarily migrates data to a volume having a different volume type. Additionally, the example shown in FIG. 8 illustrates that, for the migration plan "MP2", a migration execution specified time is set so that data migration will commence at "0:00" on "2007/02/20", and also that this data migration has already been performed.

The migration volume management table 35 is a table for managing volumes that are the migration source and the migration destination, and managing whether the data migration by each migration pair in the created migration plan is temporary. As shown in FIG. 9, the migration volume management table 35 includes: a "migration plan name" field 35A, a "migration source volume name" field 35B, a "migration destination volume name" field 35C and a "temporary migration" field 35D.

The name of a corresponding migration plan is stored in the "migration plan name" field 35A, while names of respective volumes that are the data migration source and the data migration destination which configure a corresponding migration pair are respectively stored in the "migration source volume name" field 35B and the "migration destination volume name" field 35C. In addition, information ("Yes" or "No") indicating whether data migration by the migration pair is temporary is stored in the "temporary migration" field 35D.

Accordingly, FIG. 9 shows that data migration according to the migration pair formed by a data migration source volume of "NV1" and a data migration destination volume of "NV11" which have been specified by a migration plan denoted as "MP1" is not temporary, while data migration according to the migration pair of a data migration source volume of "VV1" and a data migration destination volume of "NV21" which have been specified by a migration plan denoted as "MP2" is temporary ("Yes").

The migration volume temporary table 36 is a table for managing data migration source volumes which have performed temporary data migration, and as shown in FIG. 10, includes a "volume name" field 36A, an "attribute name" field 36B, a "temporary volume attribute value" field 36C and an "ultimate volume attribute value" field 36D.

A name of a data migration source volume that has temporarily performed data migration to a volume with a different attribute (volume name, logical capacity, volume type, volume chassis or the like) is stored in the "volume name" field 36A, while the names of the attributes of the attribute values stored in the "temporary volume attribute value" field 36C and the "ultimate volume attribute value" field 36D are stored in the "attribute name" field 36B. In addition, an attribute value of the volume that is the temporary data migration destination is stored in the "temporary volume attribute value" field 36C, while an attribute value of the volume that is the ultimate data migration destination is stored in the "ultimate volume attribute value" field 36D.

Accordingly, FIG. 10 shows that there are volumes such as "NV2" and "VV2", which have temporarily migrated data to volumes of different types, and, for instance, in the case of "NV2", data is currently migrated to a "virtual volume" but the data will ultimately be migrated to a "normal volume".

The volume creation waiting table 37 is a table for managing volumes to be created by the volume creation program 28, and as shown in FIG. 11, includes a "tier name" field 37A, a "creation waiting attribute" field 37B, a "migration group name" field 37C and a "volume name" field 37D.

A name of a tier to which belongs a volume that is waiting to be created by the volume creation program 28 is stored in the "tier name" field 37A, a name of a migration group associated to the tier is stored in the "migration group name" field 37C, and the name of the volume that is waiting to be created is stored in the "volume name" field 37D. In addition, the "creation waiting attribute" field 37B is further divided into a "logical capacity" field 37E, a "volume attribute" field 37F and the like which respectively correspond to the various attributes of the volumes. Corresponding attributes of the volume that is waiting to be created is stored in the "logical capacity" field 37E, the "volume attribute" field 37F and the like.

Accordingly, FIG. 11 shows that a volume denoted as "NV2" of a migration group denoted as "MG2" is currently in a creation-waiting state in a tier denoted as "Tier 1", and that the attributes of the volume include a logical capacity of "50 GB", a volume attribute of "normal volume", and so on.

The virtual pool management table 38 is a table for managing virtual pools provided in the internal storage device 4 or the external storage devices 5, and as shown in FIG. 12, include a "virtual pool name" field 38A, a "logical capacity" field 38B and a "virtual pool free space" field 38C.

A corresponding virtual pool name, logical capacity and free space are respectively stored in the "virtual pool name" field 38A, the "logical capacity" field 38B and the "virtual pool free space" field 38C. Accordingly, FIG. 12 shows that a virtual pool denoted as "VP1" has a logical capacity of "100 TB" which includes a free space of "10 TB".

(2-2) Configuration of the Respective GUI Screens

Next, with respect to the migration function according to the present embodiment, a description will be given on each GUI (Graphical User Interface) screen displayed on an output device of the management server 7.

(2-2-1) Volume Relocation Control Screen

Figure 13:
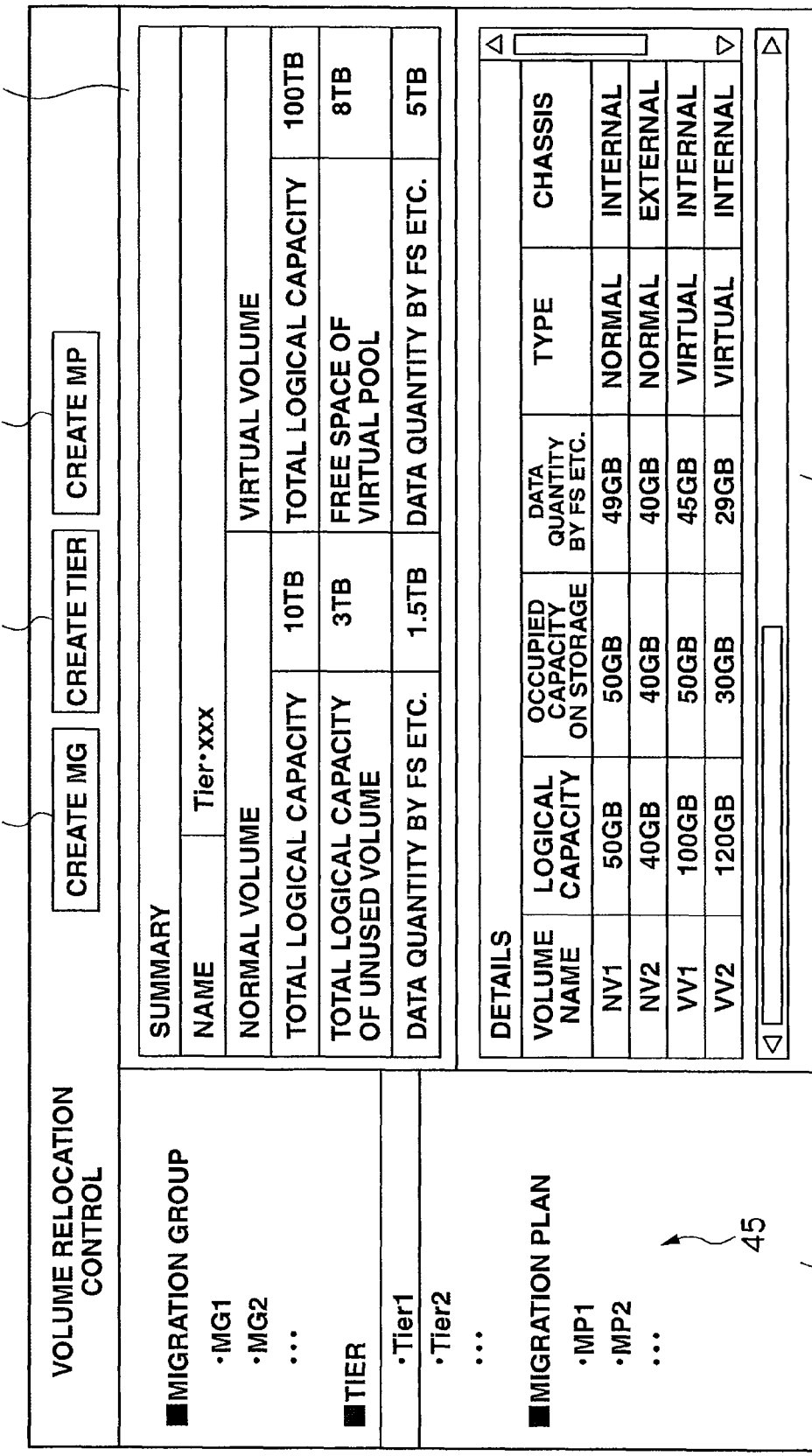
FIG. 13 is a schematic diagram showing a volume relocation control screen.

FIG. 13 shows a volume relocation control screen 40 that is displayed on the display unit 16 of the management server 7 when the volume relocation control main program 26 is activated. The volume relocation control screen 40 is a screen for verifying the contents of migration groups, tiers and migration plans that have already been created.

A create migration button 41, a create tier button 42 and a create migration plan button 43 are displayed on the upper portion of the volume relocation control screen 40. By clicking the create migration button 41 or the create tier button 42, the user will be able to display a migration group/tier creation screen 50 (FIG. 17), which will be described later. By clicking the create migration plan button 43, the user will be able to display a migration plan creation screen 70 (FIG. 21), which will also be described later.

Provided at the bottom left of the volume relocation control screen 40A is a list display field 44 that displays therein a list 45 of migration groups, tiers and migration plans that have already been created. The user may select a desired migration group, tier or migration plan from these migration groups, tiers and migration plans by operating a mouse or the like.

In addition, a summary display field 46 and a details display field 47 are provided at the bottom right of the volume relocation control screen 40. When a migration group, tier or migration plan is selected from the list 45, a summary of the migration group, tier or migration plan is displayed in the summary display field 46 while details of the migration group or tier are displayed in the details display field 47. FIG. 3 shows examples of a summary display and a details display in a case where a tier denoted as "Tier 1" is selected from the list 45.

Figure 14:
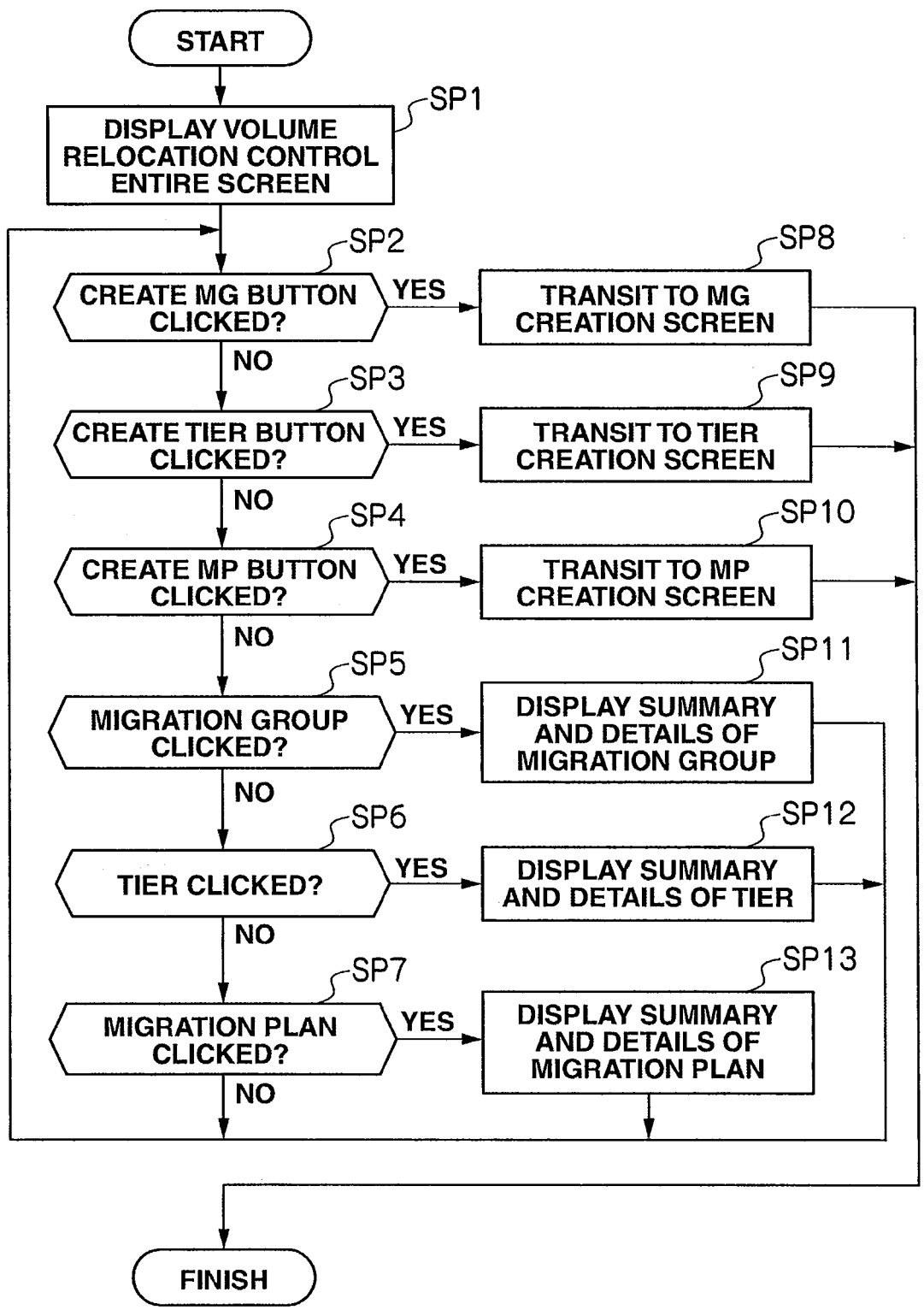
FIG. 14 is a flowchart for explaining contents of processing performed by a CPU with respect to a volume relocation control screen.

FIG. 14 is a flowchart showing specific contents of processing performed by the CPU 12 (FIG. 1) of the management server 7 in relation to the display of the volume relocation control screen 40.

When an instruction to display the volume relocation control screen 40 is inputted by the user, the CPU 12 activates the volume relocation control main program 26, and according to the volume relocation control main program 26, causes the volume relocation control screen 40 to be displayed on the display unit 16 of the management server 7 (SP1).

The CPU 12 waits for either one of the create migration group button 41, the create tier button 42 and the create migration plan button 43 to be clicked, or any of a migration group, a tier or a migration plan is selected from the list 45 displayed in the list display field 44 (SP2 to SP7-SP2).

If the create migration group button 41 is clicked, the CPU 12 activates the migration group creation program 22. As a result, according to the migration group creation program 22, the migration group/tier creation screen 50 (FIG. 17) is displayed in place of the volume relocation control screen 40 on the display unit 16 of the management server 7 (SP8). The CPU 12 subsequently concludes processing according to the volume relocation control main program 26.

If the create tier button 42 is clicked, the CPU 12 activates the tier creation program 23. As a result, according to the tier creation program 23, the migration group/tier creation screen 50 is displayed in place of the volume relocation control screen 40 on the display unit 16 of the management server 7 (SP9). The CPU 12 subsequently concludes processing according to the volume relocation control main program 26.

If the create migration plan button 43 is clicked, the CPU 12 activates the migration plan creation program 24. As a result, according to the migration plan creation program 24, the migration plan creation screen 70 (FIG. 21) is displayed in place of the volume relocation control screen 40 on the display unit 16 of the management server 7 (SP10). The CPU 12 subsequently concludes processing according to the volume relocation control main program 26.

On the other hand, if any of the migration groups, tiers and migration plans is selected from the list 45, the CPU 12 causes a "summary" and "details" of the selected migration group, tier or migration plan to be respectively displayed in the summary display field 46 and the details display field 47 of the volume relocation control screen 40 (SP 11 to SP13), and subsequently returns to step SP2.

Figures 15, 16:
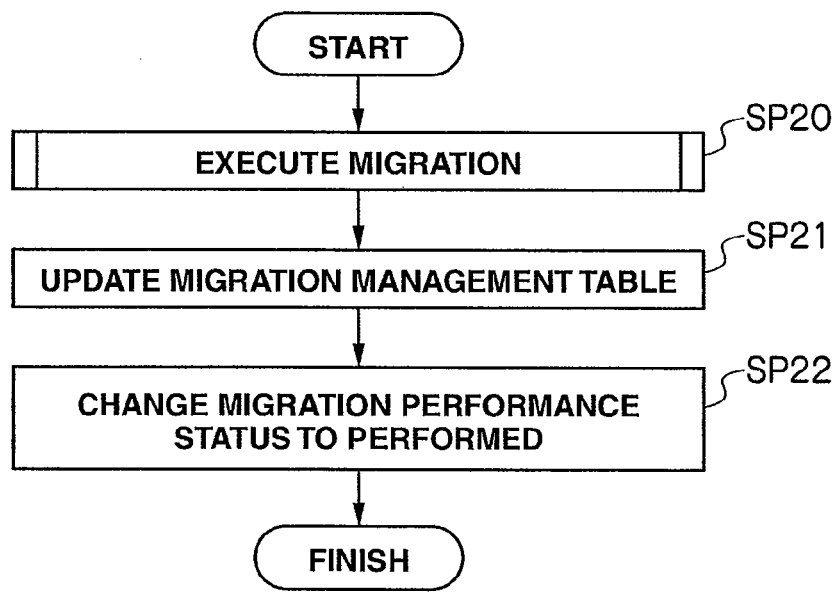
FIG. 15 is a schematic diagram for explaining a migration plan summary.
FIG. 16 is a flowchart for explaining contents of processing performed by the CPU regarding data migration.

FIG. 15 shows an example of a "summary" display of a migration plan which is displayed in the above-described step SP13 in the summary display field 46 of the volume relocation control screen 40.

As is apparent from FIG. 15, when a migration plan is selected from the list 45 on the volume relocation control screen 40, the name of a migration group that is the data migration source in the migration plan, the name of a tier that is the data migration destination, and an performance status ("performed" or "not performed") of data migration according to the migration plan are displayed as a "summary" of the selected migration plan.

In addition, an execute migration button 48 is provided in the vicinity of the display of the data migration performance status. When data migration according to the migration plan has not yet been performed ("not performed"), the execute migration button 48 becomes active-displayed. Thus, in this case, the user will be able to issue an instruction for the immediate execution of the data migration to the management server 7 by clicking the execute migration button 48.

FIG. 16 is a flowchart showing specific contents of processing performed by the CPU 12 of the management server 7 in the event that the execute migration button 48 is clicked.

When the execute migration button 48 is clicked, the CPU 12 activates the migration execution program 25. According to the migration execution program 25, the CPU 12 first causes migration according to a corresponding migration plan to be executed (SP20) by controlling the internal storage device 4 or the external storage devices 5, and subsequently changes the information stored in the "migration performance status" field 34D of a corresponding entry in the migration management table 34 (FIG. 8) to "performed" (SP21).

The CPU 12 next changes the performance status of the "summary" of the corresponding migration displayed at that point in the summary display field 46 of the volume relocation control screen 40 to "performed" (SP22), and subsequently concludes processing according to the migration execution program 25.

The series of processing shown in FIG. 16 is performed in the same manner at the arrival of a migration execution specified time, described above with reference to FIG. 8.

(2-2-2) Migration Group/Tier Creation Screen

Figure 17:
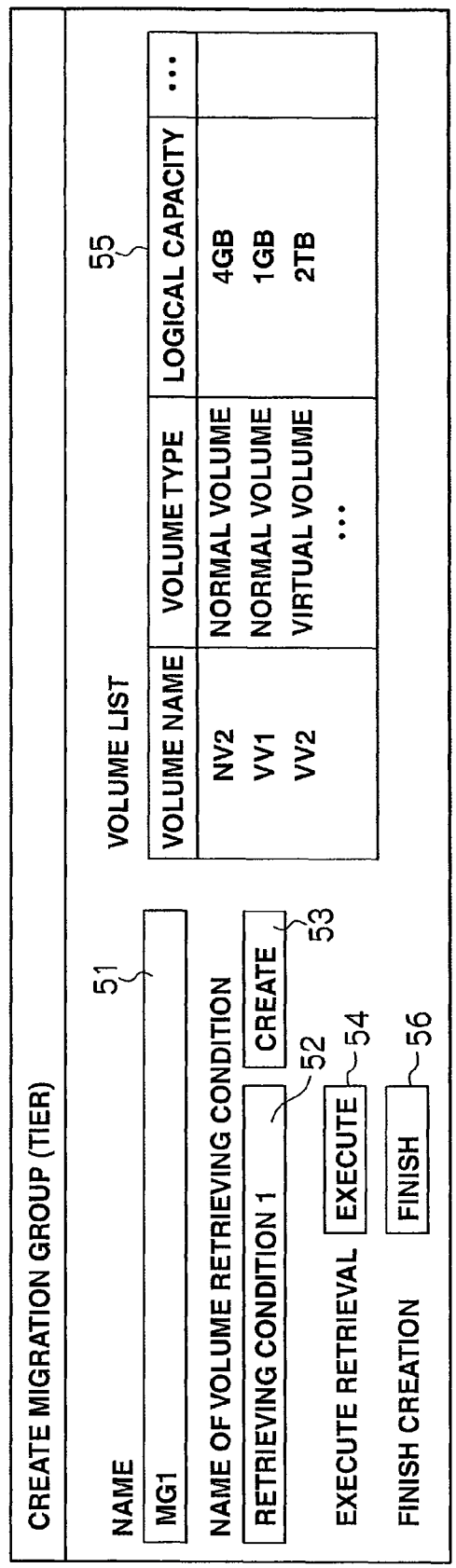
FIG. 17 is a schematic diagram showing a migration group/tier creation screen.

FIG. 17 shows a display example of the migration creation screen and the tier creation screen (hereinafter collectively referred to as the migration group/tier creation screen) 50 which are displayed on the display unit 16 of the management server 7 in place of the volume relocation control screen 40 when the create migration group button 41 or the create tier button 42 on the volume relocation control screen 40 is clicked. The migration group/tier creation screen 50 is a screen for creating a new migration group or a tier.

A name input field 51 is displayed on the top left of the migration group/tier creation screen 50. The user may input a name of a migration group or a tier to be newly created in the name input field 51.

A volume retrieving condition name field 52 for inputting a name of a volume retrieving condition that is set with respect to the migration group or the tier to be newly created and a create volume retrieving condition button 53 are provided below the name input field 51. By clicking the create volume retrieving condition button 53 on the migration group/tier creation screen 50, a volume retrieving condition creation screen 60, which will be described later with reference to FIG. 19, will be displayed.

In addition, in a case where a migration group is to be created, an execute retrieval button 54 for executing volume retrieval under a volume retrieving condition registered under the name displayed in the volume retrieving condition name field 52 will be active-displayed below the volume retrieving condition name field 52. In a case where a tier is to be created, the execute retrieval button 54 will be inactive-displayed.

Accordingly, on the migration group/tier creation screen 50, by first having the name of a desired volume retrieving condition displayed in the volume retrieving condition name field 52 and then clicking on the execute retrieval button 54, the user may cause the management server 7 to execute the retrieval of volumes that satisfy the volume retrieving condition from all volumes provided in the internal storage device 4 or the external storage devices 5. Volume information such as the volume name, the volume type and the logical capacity of each volume detected through the retrieval and therefore satisfying the volume retrieving condition is list-displayed in a volume list display field 55 at the right side of the screen. The user may also select unwanted volumes from the respective volumes having their volume information displayed in the volume list 55, and delete such volume information from the volume list 55.

On the migration group/tier creation screen 50, by first leaving only desired volumes in the volume list display field 55 as described above when creating a migration group and then clicking on a finish button 56 provided below the execute retrieval button 54, the user may set each volume having their volume information displayed in the volume list display field 55 at that point as a volume belonging to the migration group created at that point. In addition, on the migration group/tier creation screen 50, by first having the name of a desired retrieving condition displayed in the volume retrieving condition name field 52 during tier creation and then clicking on the finish button 56, the user may set the volume retrieving condition having its name inputted in the volume retrieving condition name field 52 at that point as the volume retrieving condition for that tier.

Figure 18:
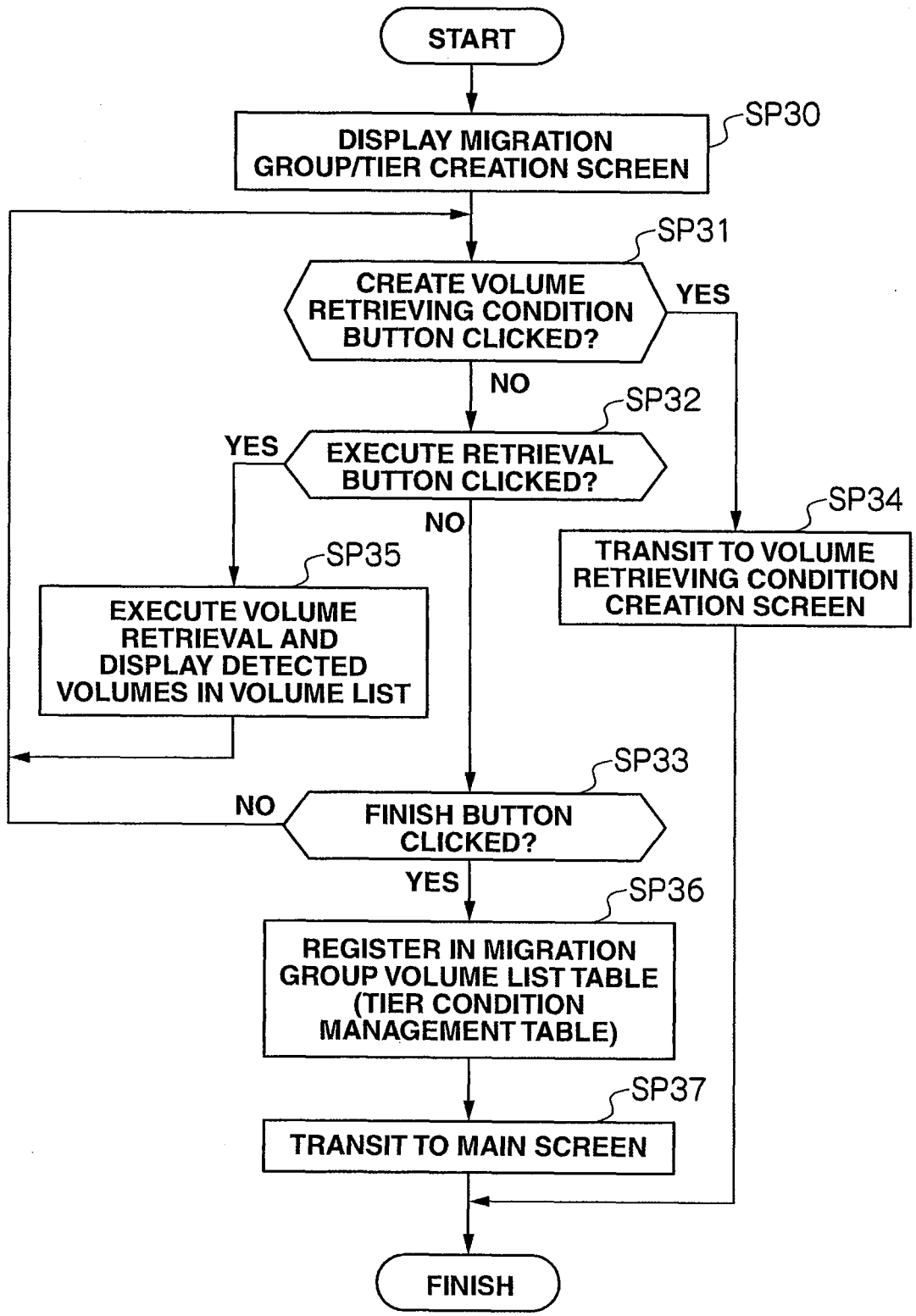
FIG. 18 is a flowchart for explaining contents of processing performed by the CPU with respect to the migration group/tier creation screen.

FIG. 18 is a flowchart showing specific contents of processing performed by the CPU 12 of the management server 7 in relation to the migration group/tier creation screen 50 described above.

When the create migration group button 41 or the create tier button 42 on the volume relocation control screen 40 is clicked, the CPU 12 activates the migration group creation program 22 (FIG. 2) or the tier creation program 23 (FIG. 2), and according to the migration group creation program 22 or the tier creation program 23, first causes the migration group/tier creation screen 50 to be displayed on the display unit 16 of the management server 7 (SP30).

The CPU 12 waits for the create volume retrieving condition button 53, the execute retrieval button 54 or the finish button 56 of the migration group/tier creation screen 50 to be clicked (SP31 to 33, SP31). If the create volume retrieving condition button 53 is clicked, the CPU 12 activates the volume retrieving condition program 21 (FIG. 2). As a result, according to the volume retrieving condition program 21, the volume retrieving condition creation screen 60, which will be described later with reference to FIG. 19, will be displayed in place of the migration group/tier creation screen 50 on the display unit 16 of the management server 7. (SP34). The CPU 12 then concludes processing according to the migration group creation program 22 or the tier creation program 23.

On the other hand, if the execute retrieval button 54 is clicked, the CPU 12 references the volume information management table 30 (FIG. 4) and the volume retrieving condition management table 31 (FIG. 5), retrieves a volume that satisfies the volume retrieving condition displayed at this point in the volume retrieving condition name field 52, and displays volume information of a relevant volume detected through the retrieval in the volume list 55 (SP35).

More specifically, if the execute retrieval button 54 is clicked, the CPU 12 accesses the internal storage device 4 according to the volume information acquisition program 20 (FIG. 2), and collects volume information retained in the internal storage device 4 on each volume of the internal storage device 4 and the external storage devices 5. Based on each piece of collected volume information, the CPU 12 then retrieves volumes satisfying the volume retrieving condition set at that point, and list-displays volume information of volumes detected through the retrieval in the volume display field 55.

On the other hand, when the finish button 56 is clicked and if what had been created at that point is a migration group, the names of each volume with their volume information stored in the volume list display field 55 in the migration group/tier creation screen 50 is associated with the name of the migration group created at that point and registered in the migration group volume list management table 32 (FIG. 6). In addition, if what had been created at that point is a tier, the CPU 12 associates the name of the created tier with the volume retrieving condition displayed at that point in the volume retrieving condition name field 52, and registers the same in the tier condition management table 33 (FIG. 7) (SP36).

The CPU 12 then activates the volume relocation control main program 26. As a result, according to the volume relocation control main program 26, the above-described volume relocation control screen 40 is displayed on the display unit 16 of the management server 7 (SP37). The CPU 12 subsequently concludes processing according to the migration group creation program 22 or the tier creation program 23.

(2-2-3) Volume Retrieving Condition Creation Screen

Figure 19:
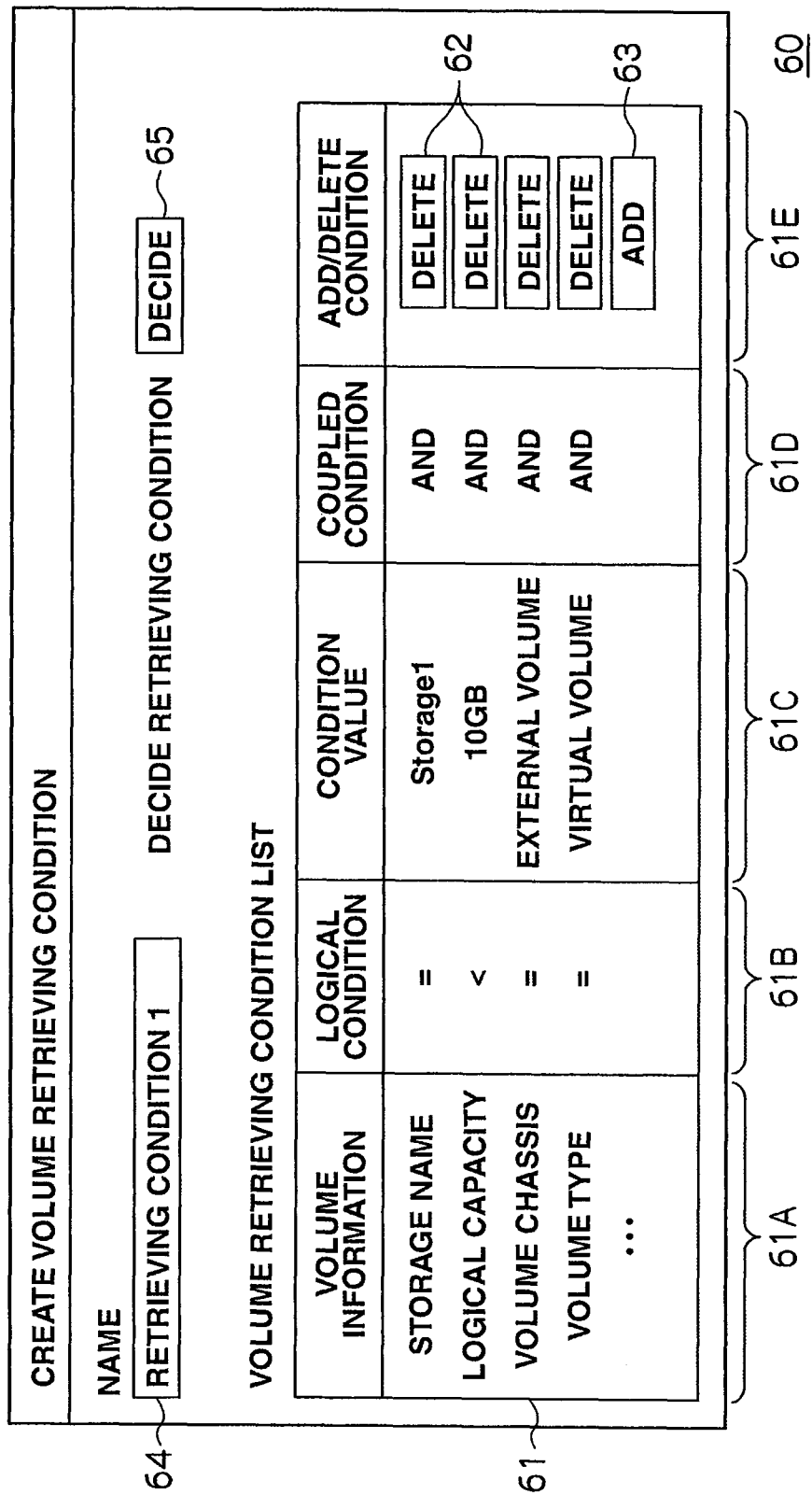
FIG. 19 is a schematic diagram showing a volume retrieving condition creation screen.

FIG. 19 shows an example of a display of the volume retrieving condition creation screen 60 that is displayed on the display unit 16 of the management server 7 in place of the migration group/tier creation screen 50 when the create volume retrieving condition button 53 on the migration group/tier creation screen 50 is clicked. The volume retrieving condition creation screen 60 is a screen for creating a new volume retrieving condition.

As is apparent from FIG. 19, a volume retrieving condition list 61 is displayed on the lower portion of the volume retrieving condition creation screen 60. The volume retrieving condition list 61 is an area for the user to set and confirm a desired volume retrieving condition, and includes: a "volume information" field 61A, a "logical condition" field 61B, a "condition value" field 61C, a "coupled condition" field 61D and an "add/delete condition" field 61E.

In the volume retrieving condition list 61, an item of volume information (storage name, logical capacity, volume chassis, volume type or the like) to be used as volume retrieving condition may be inputted in the "volume information" field 61A, while a desired condition value of the corresponding volume information item may be inputted in the "condition value" field 61C.

In addition, a logical condition (equal (=), larger than (>), smaller than (<), equal to or larger than (.ltoreq.), equal to smaller than (.ltoreq.) or the like) of a retrieval target volume of the condition value may be inputted in the "logical condition" field 61B. A coupled condition with a retrieving condition ("AND" or "OR") described on another row may be inputted in the "coupled condition" field 61D. Furthermore, in the "add/delete condition" field 61E, a delete button 62 is displayed in rows in which retrieving conditions have already been inputted, while an add button 63 is displayed in the last row in which a retrieving condition has not been inputted.

Accordingly, by clicking any of the delete buttons 62 in the volume retrieving condition list 61, the user may delete the retrieving condition of a corresponding row from the volume retrieving condition list 61, and by clicking the add button 63, the user may add a row for setting a new retrieving condition to the volume retrieving condition list 61.

On the volume retrieving condition creation screen 60, by first creating a desired volume retrieving condition using the volume retrieving condition list 61 at that point and inputting the name of the created volume retrieving condition in a retrieving condition name input field 64 provided on an upper portion of the screen, and clicking a decide button 65 provided on an upper portion of the screen allows the created volume retrieving condition to be registered as a new volume retrieving condition having its name inputted to the retrieving condition name input field 64.

Figure 20:
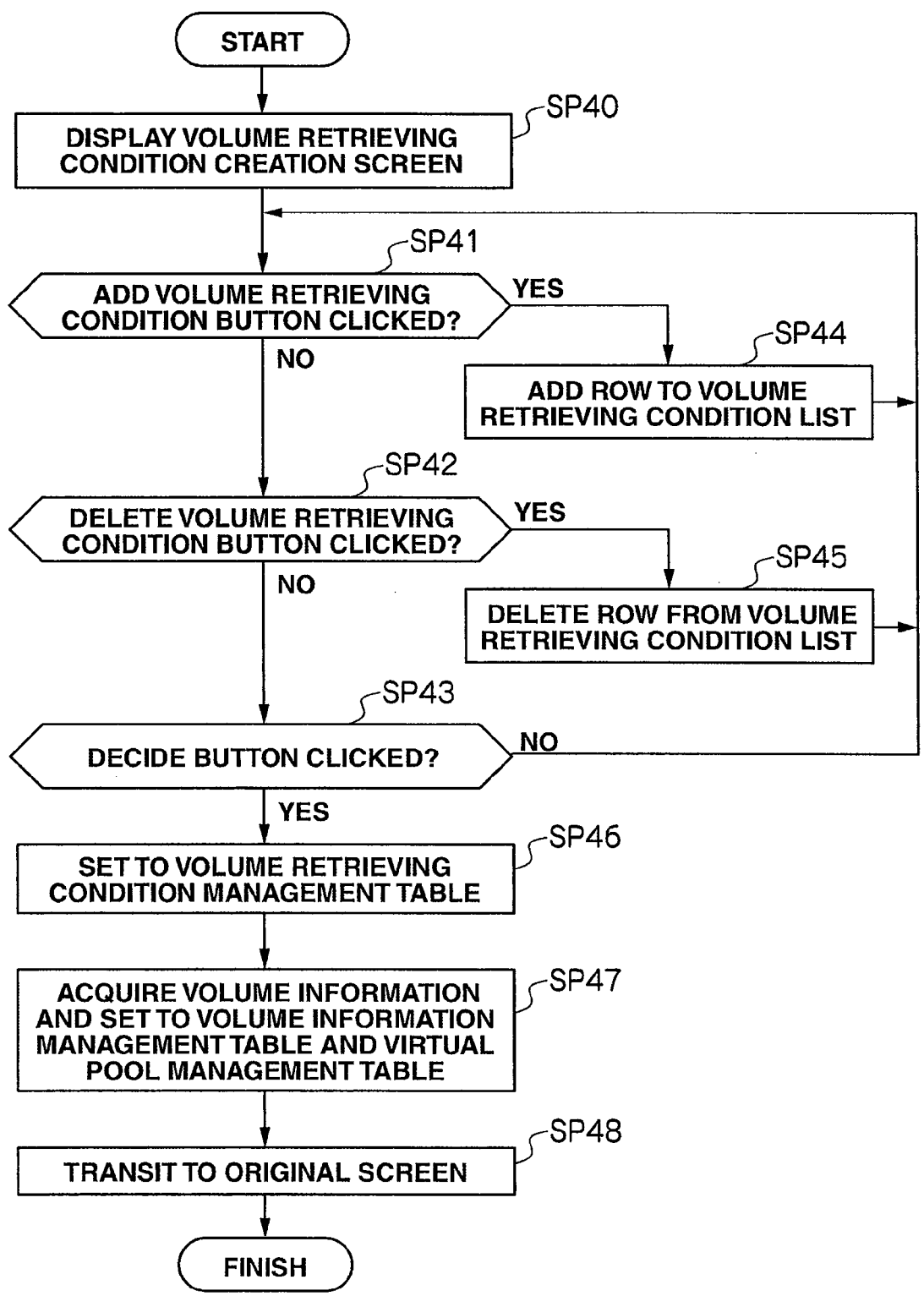
FIG. 20 is a flowchart for explaining contents of processing performed by the CPU with respect to a volume retrieving condition creation screen.

FIG. 20 is a flowchart showing specific contents of processing performed by the CPU 12 of the management server 7 in relation to the volume retrieving condition creation screen 60 described above.

When the create button 54 on the migration group/tier creation screen 50 described above with reference to FIG. 17 is clicked, the CPU 12 activates the volume retrieving condition program 21, and according to the volume retrieving condition program 21, first causes the volume retrieving condition creation screen 60 to be displayed on the display unit 16 of the management server 7 in place of the migration group/tier creation screen 50.

The CPU 12 waits for any of the add button 62, the delete button 63 or the decide button 65 to be clicked (SP41 to 43, SP41). When the add button 62 is clicked, the CPU 12 adds a row for setting a new volume retrieving condition to the volume retrieving condition list 61 (SP44), and when any of the delete buttons 63 is clicked, the CPU 12 deletes the volume retrieving condition of the corresponding row from the volume retrieving condition list 61 (SP45) and waits for any of the add button 62, the delete button 63 or the decide button 65 to be clicked once again (SP41 to SP43-SP41).

When the decide button 65 is clicked, the CPU 12 associates a volume retrieving condition created using the volume retrieving condition list 61 at that point to a name of the volume retrieving condition inputted to the retrieving condition name input field 64, and sets the same in the volume retrieving condition management table 31 (FIG. 5) (SP46).

The CPU 12 then activates the volume information acquisition program 20 (FIG. 2), collects volume information of volumes satisfying the volume retrieving condition displayed in the volume retrieving condition list 61 from the internal storage device 4 and/or the external storage devices 5 according to the volume information acquisition program 20, and registers volume information of each retrieved corresponding volume in the volume information management table 30 (FIG. 4) and the virtual pool management table 38 (FIG. 12) (SP47).

The CPU 12 then activates the migration group creation program 22 (FIG. 2). As a result, according to the migration group creation program 22, the above-described migration group/tier creation screen 50 is displayed on the display unit 16 of the management server 7 (SP48). The CPU 12 subsequently concludes processing according to the volume retrieving condition program 21.

(2-2-4) Migration Plan Creation Screen

Figure 21:
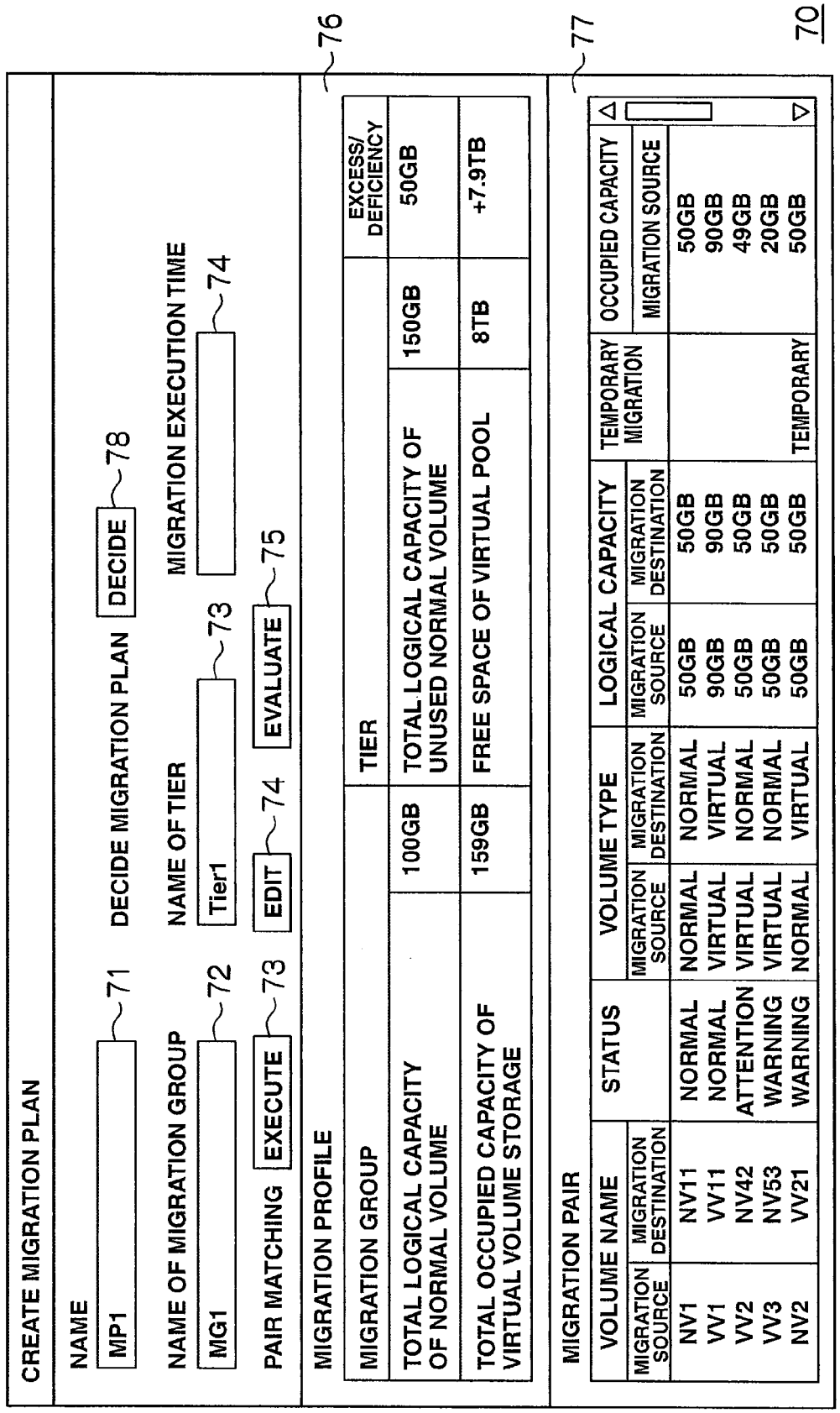
FIG. 21 is a schematic diagram showing a migration plan creation screen.

Meanwhile, FIG. 21 shows an example of a display of the migration plan creation screen 70 that is displayed on the display unit 16 of the management server 7 in place of the volume relocation control screen 40 when the create migration plan button 43 on the volume relocation control screen 40 is clicked. The migration plan creation screen 70 is a screen for creating a new migration plan.

A migration plan name input field 71, a migration group name input field 72, a tier name input field 73 and a migration execution time input field 74 are displayed on the upper portion of the migration plan creation screen 70. The user will be able to input the name of a migration plan to be newly created in the migration plan name input field 71, and for a migration plan that is to be newly created, respectively input the name of a migration group that will be the data migration source, the name of a tier that will be the data migration destination and the start time of execution of the migration in the migration group name input field 72, the tier name input field 73 and the migration execution time input field 74.

An execute button 73, an edit button 74 and an evaluate button 75 are provided below the migration group name input field 72 on the migration plan creation screen 70. Among these buttons, by clicking the execute button 73, a migration pair may be created (pair matching) for each volume in the migration group that has its name inputted in the migration group name input field 72 and which has the volume as a data migration source and any of the volumes in the tier inputted in the tier name input field 73 as a data migration destination.

At this point, a profile regarding a migration having the migration group as a data migration source and the tier as a data migration destination will be displayed in tabular format in a migration profile display field 76 provided at the middle of the migration plan creation screen 70. More specifically, as a profile, the migration profile display field 76 will display: the total logical capacity of normal volumes belonging to the migration group (a summation of the predetermined logical capacity of each normal volume) and the total occupied capacity of virtual volumes on the internal storage device 4 or the external storage devices 5, the total logical capacity of unused normal volumes and the free space of virtual pools on the tier, the excess/deficiency of the total logical capacity of the normal volumes in the migration group with respect to the total logical capacity of unused normal volumes in the tier, and the excess/deficiency of the total occupied capacity of virtual volumes on the internal storage device 4 or the external storage devices 5 in the migration group with respect to the free space of virtual pools on the tier.

In addition, as described above, when the creation of a migration pair is instructed by specifying a migration group and a tier, migration pair information on each migration pair created at that point is displayed in tabular format in a migration pair information display field 77 provided at a lower portion of the migration plan creation screen 70. More specifically, as migration pair information for each migration pair, the migration pair information display field 77 will display therein: the names of each of the volumes that are the data migration source and the data migration destination ("volume name"), a volume type ("volume type") and logical capacity ("logical capacity"), a status of the created migration pair ("status"), information on whether data migration of the migration pair is temporary or not ("temporary migration"), and an occupied capacity of the volume that is the data migration source on the internal storage device 4 or the external storage devices 5 ("occupied capacity").

Furthermore, by clicking the edit button 74 on the migration plan creation screen 70, the settings of each migration pair displayed in the migration pair information display field 77 may be edited (changed), and by clicking on the evaluate button 75, a migration plan evaluation screen 80 (FIG. 30), which will be described later, will be displayed on the display unit 16 of the management server 7 in place of the migration plan creation screen 70.

Subsequently, on the migration plan creation screen 70, a desired migration plan created as described above may be registered by clicking the decide button 78 displayed at the upper portion of the screen.

Figure 22:
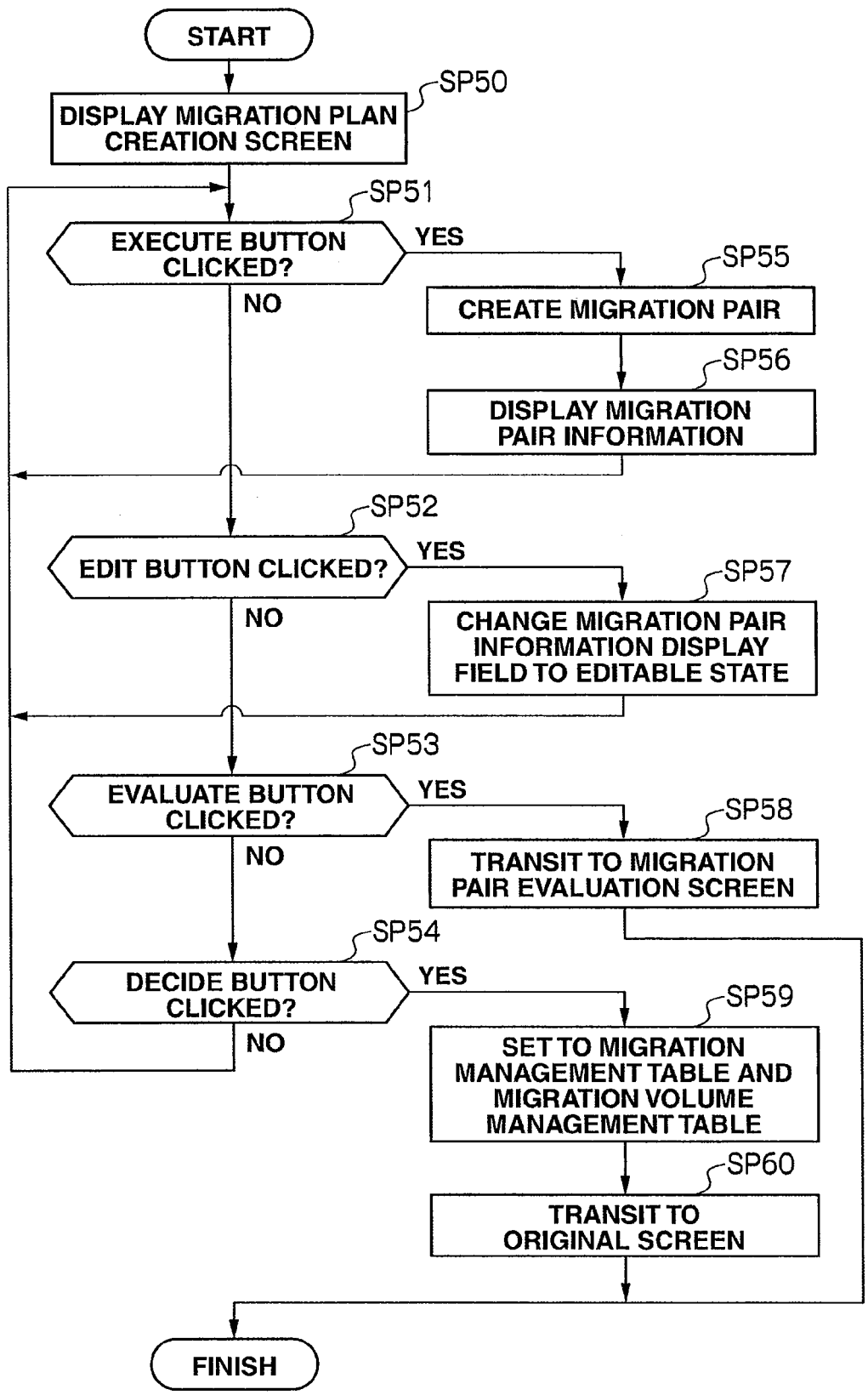
FIG. 22 is a flowchart for explaining contents of processing performed by the CPU with respect to a migration plan creation screen.

FIG. 22 is a flowchart showing specific contents of processing performed by the CPU 12 of the management server 7 in relation to the migration plan creation screen 70 described above.

When the create migration plan button 43 on the volume relocation control screen 40 (FIG. 13) is clicked, the CPU 12 commences migration plan creation screen display processing according to the migration plan creation program 24 (FIG. 2), and first causes the migration plan creation screen 70 to be displayed on the display unit 16 on the management server 7 (SP50).

The CPU 12 waits for any of the execute button 73, the edit button 74, the evaluate button 75 or the decide button 78 on the migration plan creation screen 70 to be clicked (SP51 to 54-SP51).

When the execute button 73 is clicked, based on the volume information management table 30 (FIG. 4), migration group volume list management table 32 (FIG. 6), the tier condition management table 33 (FIG. 7) and the virtual pool management table (FIG. 12), the CPU 12 creates a migration pair by executing pair matching between each volume in a migration group having its name inputted in the migration group name input field 72 of the migration plan creation screen 70 at that point and volumes in the tier having its name inputted in the tier name input field 73 of the migration plan creation screen 70 at that point (SP55).

The CPU 12 causes a profile regarding data migration between the migration group and the tier to be displayed in the migration profile display field 76, and displays the migration pair information of each migration pair created at this point in the migration pair information display field 77 of the migration plan creation screen 70 (SP56). The CPU 12 then waits for any of the execute button 73, the edit button 74, the evaluate button 75 or the decide button 78 on the migration plan creation screen 70 to be clicked once again (SP51 to SP54-SP51).

When the edit button 74 is clicked, the CPU 12 changes the migration pair information display field 77 of the migration plan creation screen 70 to an editable state (SP57). Thus, at this point, the user will be able to perform such editing as changing the volume name, volume type or the like of the data migration destination volume in the migration pair information display field 77, or setting migration of a desired migration pair to temporary migration by inputting a character string of "temporary" to the "temporary migration" field of a corresponding row of the migration pair information display field 77. The CPU 12 then waits for any of the execute button 73, the edit button 74, the evaluate button 75 or the decide button 78 on the migration plan creation screen 70 to be clicked (SP51 to SP54-SP51).

When the evaluate button 75 is clicked, the CPU 12 causes a migration pair evaluation screen 80 (FIG. 30), which will be described later, that is an evaluation screen with respect to each migration pair having its migration pair information displayed at that point in the migration pair information display field 77 of the migration plan creation screen 70, to be displayed on the display unit 16 on the management server 7 in place of the migration plan creation screen 70 (SP58), and subsequently concludes processing according to the migration plan creation program 24.

When the decide button 78 is clicked, the CPU 12 stores information regarding the migration plan created at that point in the migration management table 34 (FIG. 8) and the migration volume management table 35 (FIG. 9) (SP59).

The CPU 12 subsequently activates the volume relocation control main program 26. As a result, according to the volume relocation control main program 26, the volume relocation control screen 40, described above with reference to FIG. 13, will be displayed in place of the migration plan creation screen 70 on the display unit 16 of the management server 7 (SP60). The CPU 12 subsequently concludes processing according to the migration plan creation program 24.

(2-3) Various Features Built into the Management Server

Next, various functions related to the migration function and built into the management server 7 will be described.

(2-3-1) Volume Relocation Control Screen Display Function

Generally, it is likely that a logical capacity of a virtual volume will be created larger than that of a normal volume. Therefore, there is a problem in that the ratio of the total logical capacity of normal volumes with respect to the total logical capacity of virtual volumes will decrease in the summary display of a migration group or a tier in the volume relocation control screen 40, and determination of migration based on total logical capacity can no longer be made.

In addition, generally, with respect to a migration group that is a data migration source when creating a migration plan, a capacity necessary for a tier that is the data migration destination is determined based on total logical capacity in the case of normal volumes and on total occupied capacity on the internal storage device 4 or the external storage devices 5 in the case of virtual volumes. Therefore, in the summary of a migration group displayed on the volume relocation control screen 40, there is a problem that such determination cannot be made when the total logical capacities of normal volumes and virtual volumes and the total occupied capacity on the internal storage device 4 or the external storage devices 5 are mixed up in the display.

Furthermore, when creating a migration plan, with respect to a tier that is a data migration destination, whether a capacity necessary for a migration group that is the data migration source is occupied is determined based on the total logical capacity of unused volumes in the case of normal volumes and on free space of virtual pools in the case of virtual volumes. Therefore, in the summary of a tier displayed on the volume relocation control screen 40, there is a problem that such determination cannot be made when the total logical capacity of normal volumes and virtual volumes and the total occupied capacity on the internal storage device 4 or the external storage devices 5 are mixed up in the display.

In this light, the present embodiment is arranged so that, when normal volumes and virtual volumes coexist in migration groups or tiers, total logical capacity, total occupied capacity on the internal storage device 4 or the external storage devices 5, total logical capacity of unused volumes and the like are displayed separately for normal volumes and virtual volumes. This allows the user to immediately determine through visual observation how much capacity will be required for a tier that will be the data migration destination based on the summary of a migration group displayed on the volume relocation control screen 40, and immediately determine through visual observation whether the tier has sufficient capacity for migration of a volume of the migration group that is the data migration source based on the summary of the tier displayed on the volume relocation control screen 40.

FIG. 23 shows an example of a display of a "summary" of a migration group on the volume relocation control screen 40. When a migration group is selected from the list 45 of the list display unit 44 on the volume relocation control screen 40, as the "summary" of the migration group, a name of the migration group ("name") will be displayed, and a total logical capacity of volumes belonging to the migration group ("total logical capacity"), an occupied capacity on the internal storage device 4 or the external storage devices 5 ("total occupied capacity on storage"), and data quantity of data stored by the file system and the like will be displayed separately for normal volumes and virtual volumes.

FIG. 24 shows an example of a display of a "summary" of a tier on the volume relocation control screen 40. When a tier is selected from the list 45 of the list display unit 44 on the volume relocation control screen 40, as the "summary" of the tier, a name of the tier ("name") will be displayed, and a total logical capacity of volumes belonging to the tier ("total logical capacity"), a total logical capacity of unused volumes (normal volumes) or a free space of the virtual pool (virtual volumes), and data quantity of data stored by the file system and the like will be displayed separately for normal volumes and virtual volumes.

Figure 25:
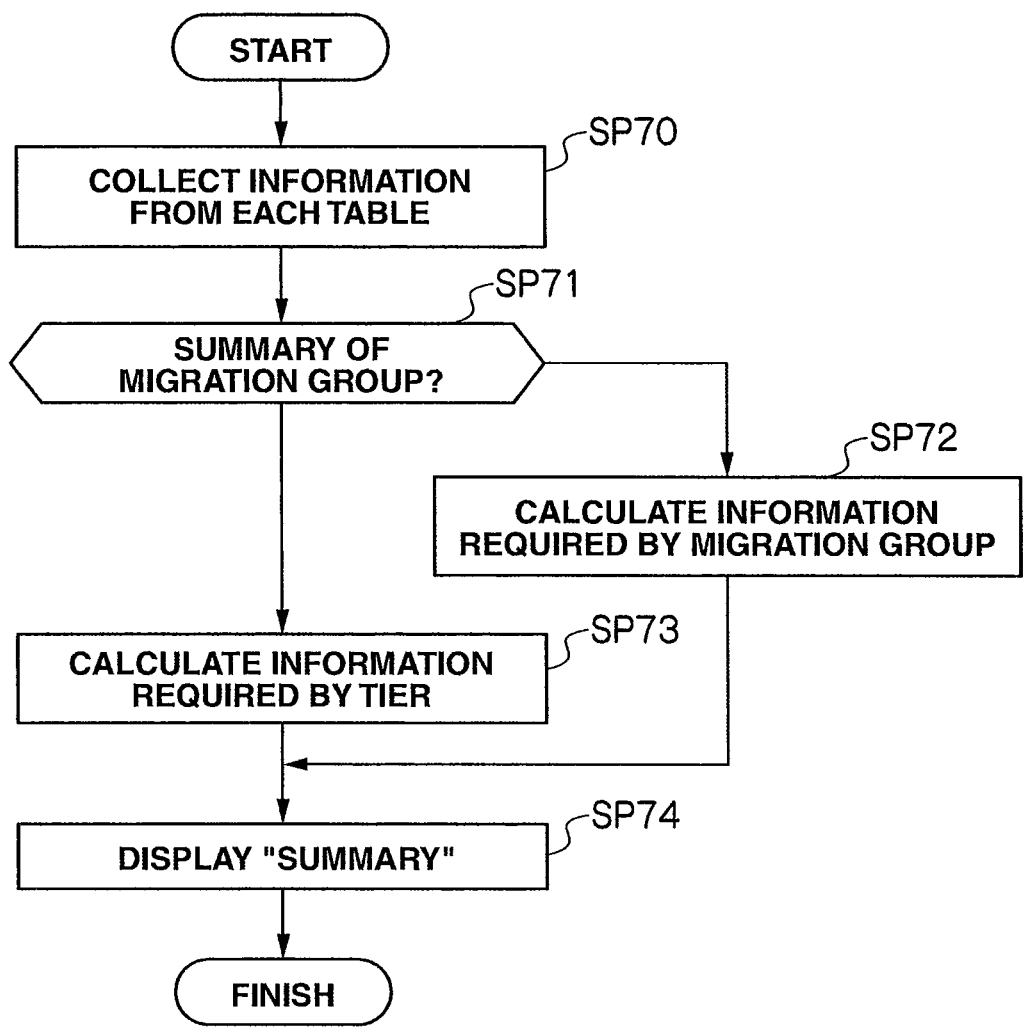
FIG. 25 is a flowchart for explaining summary display processing.

FIG. 25 is a flowchart showing specific contents of processing performed by the CPU 12 of the management server 7 in relation to the displaying of a "summary" of a migration group or a tier on the volume relocation control screen 40, as described above.

When the CPU 12 proceeds to step SP11 or SP12 in the processing of volume relocation control screen display described above with respect to FIG. 14, the CPU 12 commences summary display processing as shown in FIG. 25 according to the volume relocation control main program 26, and first collects necessary information from corresponding tables in the volume relocation control management table group 15 (SP70).

More specifically, when a migration group is selected from the list 45 of the volume relocation control screen 40, the CPU 12 retrieves the names of all volumes belonging to the migration group in the migration group volume list management table 32 (FIG. 6), and retrieves volume information of each volume detected through the retrieval from the volume information management table 30 (FIG. 4).

Additionally, when a tier is selected from the list 45 of the volume relocation control screen 40, the CPU 12 retrieves the name of a volume retrieving condition that is set for that tier on the tier condition management table 33 (FIG. 7), reads out specific contents of the volume retrieving condition detected through the retrieval from the volume retrieving condition management table 31 (FIG. 5), and retrieves volumes satisfying the read-out volume retrieving condition from the volume information management table 30. The CPU 12 then retrieves volume information of each corresponding volume detected through the retrieval from the volume information management table 30. When a volume detected through the retrieval is a virtual volume, the CPU 12 retrieves the logical capacity and the free space of the virtual volume from the virtual pool management table 38 (FIG. 12).

The CPU 12 next determines whether the summary display target is a migration group (whether a migration group was selected from the list 45 of the volume relocation control screen 40) (SP71).

If the determination yields a positive result, based on the various information collected in step SP70, the CPU 12 respectively calculates total logical capacities of normal volumes and virtual volumes in the migration group, the occupied capacity on the internal storage device 4 or the external storage devices 5, and the data quantity of data stored by the file system and the like (SP72).

On the other hand, a negative result of the determination in step SP71 signifies that the summary display target is a tier (a tier was selected from the list 45 of the volume relocation control screen 40). Accordingly, based on the various information collected in step SP70, the CPU 12 respectively calculates for the tier the total logical capacity of normal volumes, the total logical capacity of unused normal volumes and data quantity of data stored by the file system and the like, as well as the total logical capacity of virtual volumes, the free space of virtual pools and the data quantity of data stored by the file system and the like (SP73).

Based on the calculation result of step SP72 or SP73, the CPU 12 creates an image of a "summary" that separates information of normal volumes from that of virtual volumes as described above with reference to FIG. 23 or 24, and causes the image to be displayed in the summary display field 46 of the volume relocation control screen 40 (SP74). The CPU 12 subsequently concludes summary display processing.

(2-3-2) Migration Pair Creation/Display Function

While the logical capacity of a normal volume is equal to its occupied capacity on the internal storage device 4 or the external storage devices 5, the logical capacity of a virtual volume often differs from its occupied capacity on the internal storage device 4 or the external storage devices 5. This is due to the fact that a user frequently sets the logical capacity of a virtual volume relatively high.

Accordingly, there is a problem in that, when migrating data from a virtual volume to a normal volume, even space that is not immediately used is allocated to the normal volume and the occupied capacity of the normal volume on the internal storage device 4 or the external storage devices 5 is increased, and as a result, capacity resources on the internal storage device 4 or the external storage devices 5 are wasted. In this light, the management server 7 according to the present embodiment is arranged to create a migration pair such that the volume type and the logical capacity of the volumes that are the data migration source and the data migration destination are the same. Specifically, the management server 7 creates a migration pair so that data of a normal volume migrates to a normal volume and data of a virtual volume migrates to a virtual volume.

This is more preferable, considering the fact that when the volume that is the data migration source is a virtual volume having low free space, the above-described problem will not occur even if a normal volume is selected as a data migration source, and depletion of virtual pool capacity may be prevented. In this light, in the present embodiment, when the volume that is the data migration source is a virtual volume having low free space, a normal volume is selected as the data migration source.

On the other hand, there may be situations where a migration pair cannot be created such that the volume type and the logical capacity of the volumes that are the data migration source and the data migration destination are the same. In this light, the present embodiment is arranged so that, when displaying migration pair information of each migration pair created at that point in the migration pair information display field 77 (FIG. 21) in the migration plan creation screen 70 (FIG. 21), migration pair information of migration pairs having the same volume type for the data migration source and the data migration destination are preferentially displayed, and migration pairs having different volume types for the data migration source and the data migration destination are displayed on the migration plan creation screen 70.

More specifically, in the migration pair information display field 77 in the migration plan creation screen 70, the management server 7 displays migration pair information of migration pairs having the same volume type and logical capacity for the data migration source and the data migration destination in a row that is above migration pair information of other migration pairs.

Following migration pair information of migration pairs having the same volume type and logical capacity for the data migration source and the data migration destination, the management server 7 displays migration pair information of migration pairs in which the data migration source is a virtual volume and the free space of the data migration source virtual volume is lower than a predetermined value. In this case, the management server 7 displays a normal volume as the data migration destination and the character string "Attention" as the status of the migration pair.

The management server 7 lastly displays migration pairs having different volume types for the data migration source and the data migration destination. In this case, the management server 7 displays the character string "Warning" as the status of the migration pair.

Figure 26:
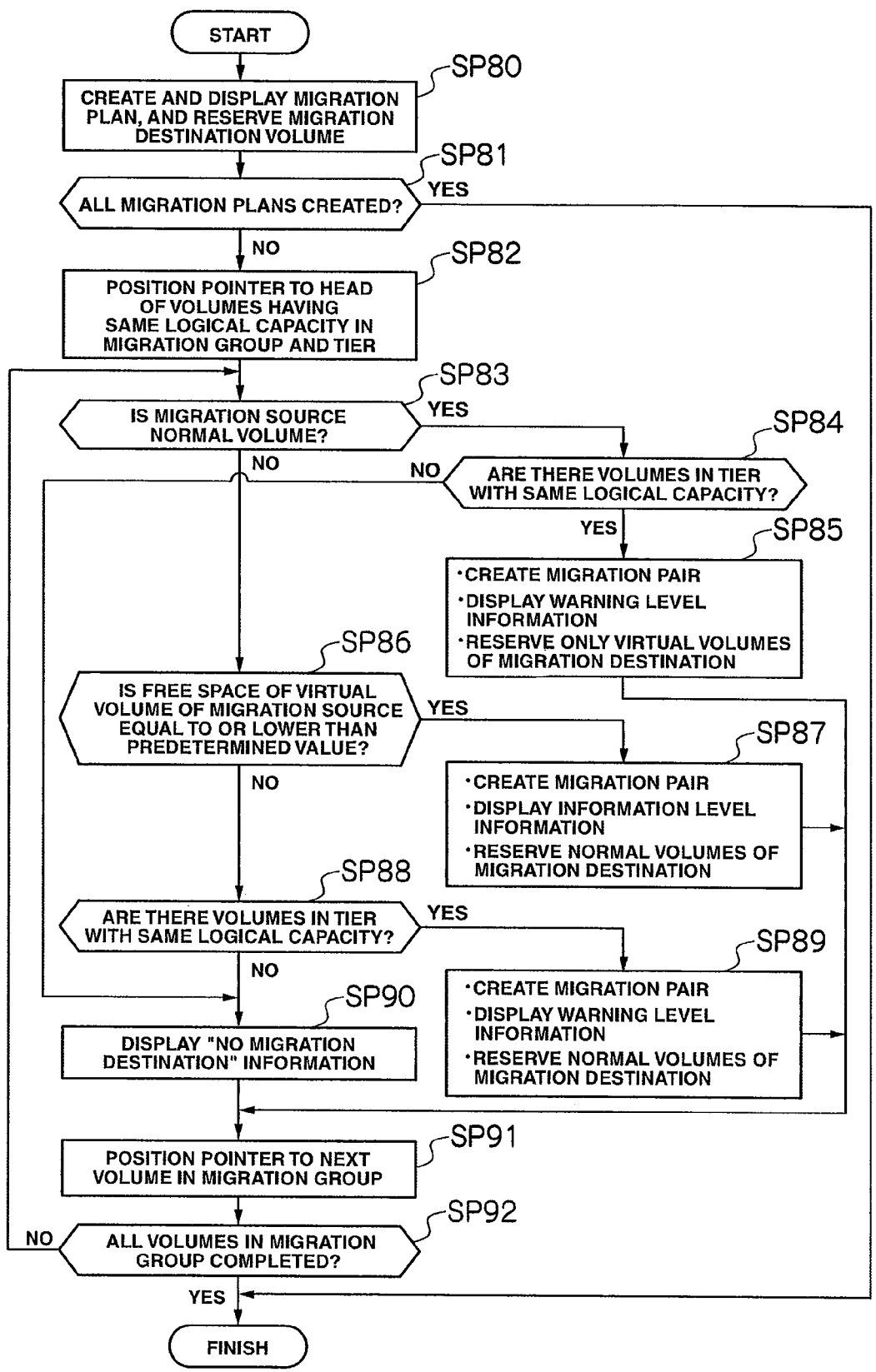
FIG. 26 is a flowchart for explaining pair matching processing.

FIG. 26 is a flowchart showing specific contents of processing performed by the CPU 12 of the management server 7 in relation to the creation of a migration pair as described above.

When the CPU 12 proceeds to step SP56 of the migration plan creation processing described above with reference to FIG. 22, the CPU 12 commences pair matching processing shown in FIG. 26 according to the migration plan creation program 24 (FIG. 2), and first compares volumes in a corresponding migration group with volumes in a corresponding tier. The CPU 12 sets volumes having the same volume type and logical capacity as a migration pair, and with respect to the volume that will become the data migration source and the volume that will become the data migration destination in the migration pair, displays the volume names, logical capacities, occupied capacities on the internal storage device 4 or the external storage devices 5 and volume types thereof, and the status of the migration pair (in this case, "normal") in corresponding areas in the migration plan creation screen 70 (FIG. 21). At this point, the CPU 12 reserves the volume that is the data migration destination of the migration pair (SP80).

The CPU 12 determines whether migration pairs have been created for all volumes in the migration group (SP81), and if a positive result is yielded, concludes the pair matching.

On the other hand, if the determination in step SP81 yields a negative result, the CPU 12 respectively positions a pointer on a volume that has not been set as a migration pair in the migration group and a volume in the tier which has the same logical capacity as the volume in the migration group (SP82).

The CPU 12 subsequently determines whether the volume type of the volume in the migration group to which the pointer is positioned is a normal volume (SP83). If the determination in step SP83 yields a positive result, the CPU 12 sequentially moves the pointer to the head of each virtual volume in the tier which has not been set as a migration pair to sequentially verify the logical capacities of the volumes. In this manner, the CPU 12 studies whether a virtual volume that has the same logical capacity as the normal volume in the migration group to which the pointer is positioned exists in the tier (SP84).

When the study does not result in a detection of the virtual volume, the CPU 12 proceeds to step SP90. However, when a virtual volume is detected, the CPU 12 creates a migration pair using the virtual volume and a normal volume in the migration group to which the pointer is positioned, and displays its migration pair information in the migration pair information display field 77 in the migration plan creation screen 70. At the same time, the CPU 12 displays the character string "Warning" as the status of the migration pair in a corresponding row in the migration pair information display field 77, and reserves the virtual volume that is set as the data migration destination in the migration pair (SP85). The CPU 12 then proceeds to step SP91.

Meanwhile, a negative result from the determination in step SP83 signifies that the volume type of the volume in the migration group to which the pointer is positioned is a virtual volume. Accordingly, the CPU 12 determines whether the free space of the virtual volume is equal to or lower than a predetermined threshold (for instance, 10% of the logical capacity of the virtual volume) (SP86).

When the determination yields a positive result, the CPU 12 searches for a normal volume that has the same logical capacity as the virtual volume in the migration group to which the pointer is positioned from the group of volumes in the tiers which have not been set as migration pairs. The CPU 12 creates a migration pair with the retrieved normal volume as the data migration destination volume and the virtual volume in the migration group to which the pointer is positioned as the data migration source volume, and displays the migration pair information of the migration pair in the migration pair information display field 77 in the migration plan creation screen 70. At the same time, the CPU 12 displays the character string "Attention" as the status of the migration pair in a corresponding row in the migration pair information display field 77, and reserves the normal volume that is set as the data migration destination in the migration pair (SP87). The CPU 12 then proceeds to step SP91.

On the other hand, if the determination of step SP86 yields a negative result, the CPU 12 studies whether a normal volume that has the same logical capacity as the normal volume in the migration group to which the pointer is positioned exists in the tier (SP88) in the same manner as in step SP84.

When the study does not result in a detection of a normal volume, the CPU 12 proceeds to step SP90. However, when a normal volume is detected, the CPU 12 creates a migration pair formed by the normal volume and the virtual volume in the migration group to which the pointer is positioned, and displays its migration pair information in the migration pair information display field 77 in the migration plan creation screen 70. At the same time, the CPU 12 displays the character string "Warning" as the status of the migration pair in a corresponding row in the migration pair information display field 77, and reserves the normal volume that is set as the data migration destination in the migration pair (SP89). The CPU 12 then proceeds to step SP91.

Meanwhile, upon proceeding to step SP90, the CPU 12 displays information indicating that a volume to be the data migration destination of the volume in the migration group to which the pointer is positioned does not exist in the tier in the migration pair information display field 77 in the migration plan creation screen 70 (SP90), and then proceeds to step SP91.

Upon proceeding to step S91, the CPU 12 positions a pointer on the next volume in the migration group which has not yet been set as a migration pair (SP91).

Subsequently, based on whether a next volume exists in step SP91, the CPU 12 determines whether processing for all volumes in the migration group has been concluded (step SP92).

A negative result of this determination signifies that migration pairs have not been created for all volumes in the migration group. Accordingly, the CPU 12 returns to step SP83, and repeats the same processing until a positive result is yielded in step SP92 (SP83 to SP92-SP83).

When a positive result is yielded in step SP92 by creating migration pairs for all volumes in the migration group, the CPU 12 concludes pair matching processing.

(2-3-3) Function During Execution of Data Migration

With the storage system 1, when the volume that is a data migration destination is a normal volume as described above, since the normal volume is reserved at the time the migration plan is created, it is unlikely that migration would fail due to reasons such as exceeded capacity.

On the other hand, when the volume that is a data migration destination is a virtual volume, only the virtual volume is reserved and the capacity of the virtual volume will not be secured (the capacity that the virtual volume is expected to consume due to data migration will not be secured in advance). Therefore, for instance, if a substantial portion of the capacity of the virtual pool is used from the creation of the migration plan to the moment of data migration, the virtual pool may not be able to supply the necessary capacity for the virtual volume, and the data migration may result in a failure.

In consideration thereof, the present embodiment is arranged to preferentially perform data migration for a migration pair having a virtual volume as its data migration destination over migration pairs having normal volumes as their data migration destinations.

Figure 27:
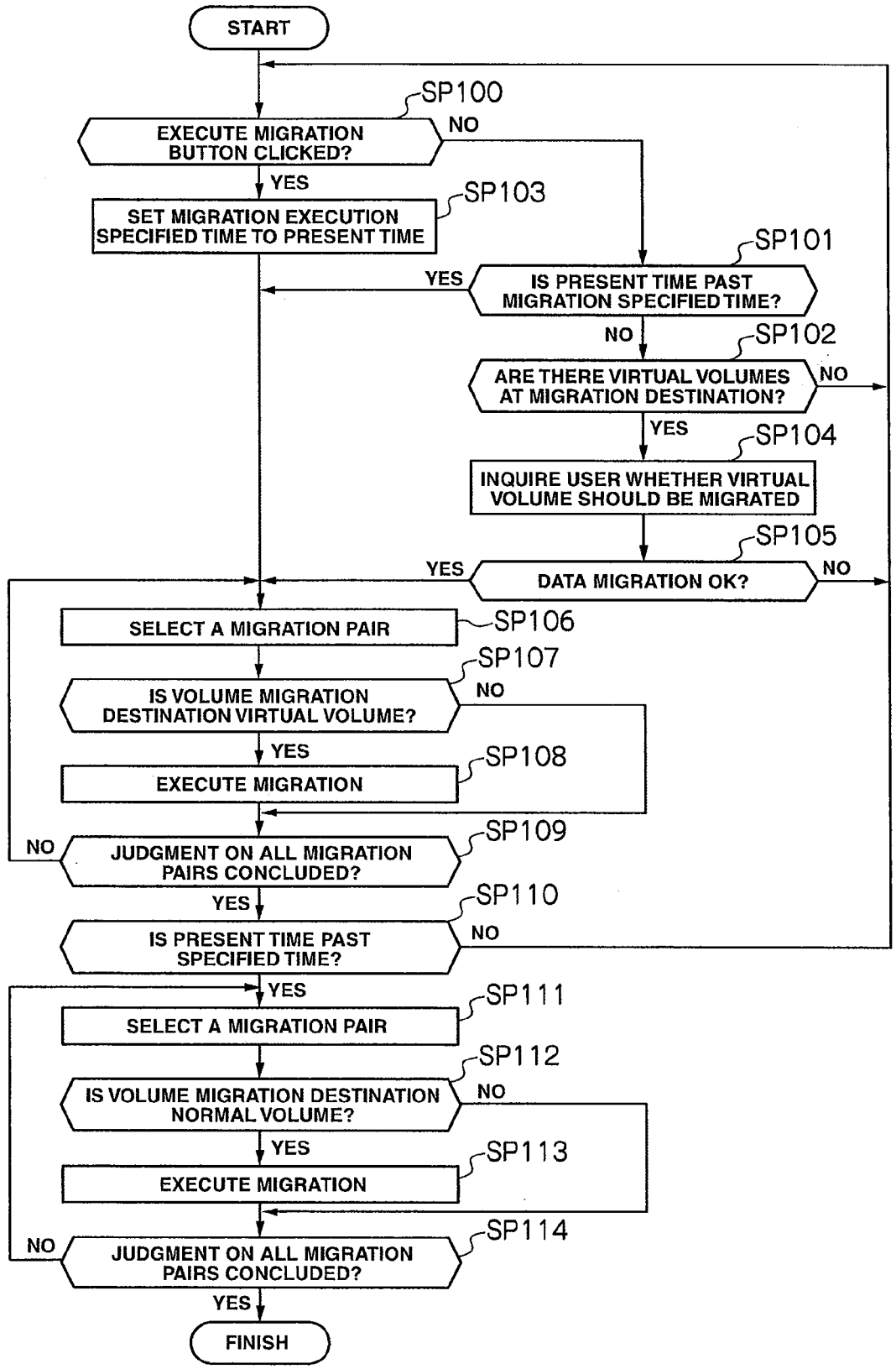
FIG. 27 is a flowchart for explaining migration execution processing.

FIG. 27 is a flowchart showing specific contents of processing performed by the CPU 12 of the management server 7 in relation to a function during data migration execution as described above.

When the CPU 12 proceeds to step SP20 shown in FIG. 16, the CPU 12 commences migration execution processing, and first sequentially determines: whether the execute migration button 48 (FIG. 15) in the summary of the migration plan displayed in the summary display field 46 of the volume relocation control screen 40 (FIG. 13) has been clicked; whether the migration execution specified time has lapsed; and whether a virtual volume exists at the data migration destination in a corresponding migration plan (SP100 to SP102).

When all the determinations yield negative results, the CPU 12 waits for either the execute migration button 48 to be clicked or the present time to pass the migration execution specified time (SP100 to SP102-SP100).

On the other hand, if the determinations in step SP102 yield positive results, the CPU 12 inquires the user with respect to a migration pair having a virtual volume as its data migration destination whether the data stored in the virtual volume should be migrated to a volume that is set in advance as the data migration destination (SP104). More specifically, the CPU 12 causes a message indicating as such, together with a dialog displaying a "YES" button and a "NO" button, to be displayed on the display unit 16 of the management server 7.

The CPU 12 waits for the user's response to the inquiry (SP105), and when a response indicating that the data migration may be executed is obtained, selects a migration pair of the target migration plan (SP106), and determines whether the volume type of the data migration destination volume is a virtual volume (SP107).

If the determination yields a negative result, the CPU 12 proceeds to step SP109. On the other hand, if a positive result is yielded, the CPU 12 executes data migration for the migration pair by controlling a corresponding internal storage device 4 or external storage devices 5 (SP108). The CPU 12 subsequently proceeds to step SP109, and determines whether the judgment of step SP107 has been concluded for all migration pairs in the migration plan (SP109).

If the determination yields a negative result, the CPU 12 returns to step SP106, and repeats the same processing until a positive result is yielded in step SP109 (SP106 to SP109-SP106). As a result, through the loop processing of steps SP106 to 109-SP106, migration will be performed for all migration pairs in the migration plan which have virtual volumes as their data migration destinations.

Eventually, when a positive result is yielded by step SP109, the CPU 12 determines whether the present time has passed the migration execution specified time (SP110). In this case, the CPU 12 returns to step SP100 since a negative result is yielded from this determination, and once again waits for either the execute migration button 48 to be clicked or the present time to pass the migration execution specified time (SP100 to SP102-SP100).

On the other hand, either after the migration execution specified time is then set to the present time in the event that the execute migration button 48 is eventually clicked, or immediately in the event that the present time passes the migration execution specified time, the CPU 12 selects a migration pair of the target migration plan (SP106), and subsequently, in the same manner as described above, performs migration for all migration pairs in the target migration plan which have virtual volumes as their data migration destinations (SP106 to SP109-SP106).

The CPU 12 then determines whether the present time has passed the migration execution specified time (SP110). In this case, since a positive result will be yielded by the determination, the CPU 12 proceeds to step SP111 to select a migration pair of the target migration plan, and determines whether the data migration destination of the migration pairs is a normal volume (SP112).

If the determination yields a negative result, the CPU 12 proceeds to step SP114. On the other hand, if a positive result is yielded, the CPU 12 executes data migration for the migration pair by controlling a corresponding internal storage device 4 or external storage devices 5 (SP113). The CPU 12 subsequently proceeds to step SP114, and determines whether the judgment of step SP112 has been concluded for all migration pairs in the migration plan.

If the determination yields a negative result, the CPU 12 returns to step SP111, and repeats the loop SP111 to SP114-SP111 until a positive result is yielded in step SP114. As a result, through the loop processing of steps SP111 to SP114-SP111, migration will be performed for all migration pairs in the migration plan which have normal volumes as their data migration destinations.

When a positive result is eventually yielded by step SP114, the CPU 12 concludes migration execution processing.

(2-3-4) Temporary Migration Setting Function

There may be cases where data migration or fixed-term data migration will be required due to matters such as failure or replacement of the internal storage device 4 or the external storage devices 5. Additionally, in such cases, data migration may be performed to an ultimate volume at a stage where certain conditions are met (for instance, newly creating a required volume). Furthermore, there is a problem in that a user will find it difficult to memorize such conditions and ultimate data migration destinations.

Thus, the present embodiment has been arranged so that, when migrating data stored in a volume to a volume that has a different volume type from a volume that is the ultimate data migration destination, the user may specify such data migration to be temporary. In addition, in the case of the present embodiment, when a data migration is specified to be temporary as described above, a notification will be issued to the user on the existence of a volume to which temporary data migration has been performed either regularly or at the time ultimate conditions are satisfied.

More specifically, as described above with reference to FIG. 21, by clicking the edit pair matching button 74 on the migration plan creation screen 70, each migration pair information displayed in the migration pair information display field 77 at that point may be changed to an editable state. In this state, the user may set the data migration to temporary by inputting information indicating that the data migration of the migration pair is temporary (the character string of "temporary") in the "temporary migration" field of the list.

Figure 28:
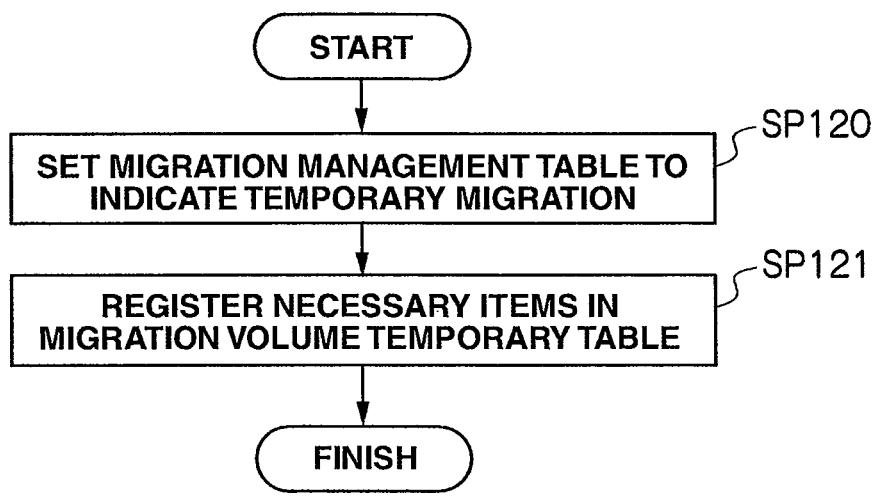
FIG. 28 is a flowchart for explaining temporary migration setting processing.

FIG. 28 is a flowchart showing specific contents of processing performed by the CPU 12 of the management server 7 when any of the migration pairs displayed in the migration pair information display field 77 on the migration plan creation screen 70 has been set to temporary data migration.

When such setting has been performed, the CPU 12 commences temporary migration setting processing as shown in FIG. 28. The CPU 12 first updates the "presence/absence of temporary migration" field 34E of the entry corresponding to the migration plan in the migration management table 34 (FIG. 8) as needed, and registers necessary information regarding the migration pair to which the setting has been performed on the migration volume management table 35 (SP120).

The CPU 12 then registers the name of the volume that is the temporary data migration destination (in this case, the data migration source volume of the migration pair), the attribute names of attributes of the temporary data migration destination volume which differ from those of the ultimate data migration destination volume (in this case, "volume attribute"), the attribute value of the temporary data migration destination volume (in this case, "virtual volume" or "normal volume") and the attribute value of the ultimate data migration destination volume (in this case, "normal volume" or "virtual volume") in the migration volume temporary table 36 (FIG. 10) (SP 121). The CPU 12 subsequently concludes temporary migration setting processing.

Figure 29:
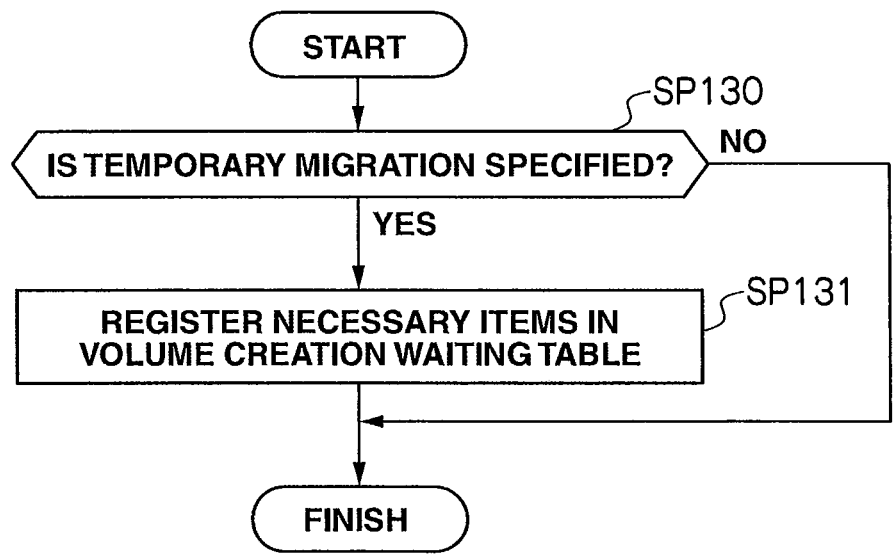
FIG. 29 is a flowchart for explaining volume creation waiting table registration processing.

On the other hand, FIG. 29 is a flowchart showing contents of volume creation waiting table registration processing that is performed regarding temporary data migration setting as described above by the CPU 12 after the conclusion of data migration execution processing.

After concluding data migration execution processing as described above with reference to FIG. 27, the CPU 12 executes volume creation waiting table registration processing shown in FIG. 29 in parallel with other processing.

In other words, when data migration execution processing is concluded, the CPU 12 commences volume creation waiting table registration processing shown in FIG. 29, and first determines whether a migration pair exists to which temporary data migration has been set in the migration plan executed at that point based on the migration management table 34 (SP130). If the determination yields a negative result, the CPU 12 concludes volume creation waiting table registration processing.

Conversely, if the determination of step SP130 yields a positive result, the CPU 12 registers the name of the tier that performed the temporary data migration, necessary volume information such as the logical capacity and the volume attribute of the volume to be newly created regarding the temporary data migration, and necessary information such as the name of a corresponding migration group and the name of a volume to be newly created in the volume creation waiting table 37 (FIG. 11) (SP131). The CPU 12 then concludes volume creation waiting table registration processing.

Subsequently, the CPU 12 regularly displays information registered in the volume creation waiting table 37 on the display unit 16 of the management server 7 in order to suggest the creation of a corresponding volume, or references the volume creation waiting table 37 each time a new volume is created and displays information of a volume for which temporary data migration is being performed and which volume attributes created at that time matches the attributes of a volume to which data migration should be ultimately performed on the display unit 16 of the management server 7.

(2-3-5) Migration Plan Evaluation Function

When migrating data respectively stored in virtual volumes belonging to a migration group to a corresponding tier, depending on the data quantity of the data to be migrated, all the data stored in these virtual volumes may not be migrated to the virtual pool in the tier that is the data migration destination. In this case, it will be difficult to determine from which virtual volume of the migration group data should be migrated to a virtual volume and from which virtual volume of the migration group should data be migrated to a normal volume.

In consideration thereof, the present embodiment is arranged to perform, when creating a migration plan, a predetermined evaluation on free space and the like with respect to each virtual volume that is the data migration source. The present embodiment is arranged so that, based on the evaluation result, a virtual volume having a low occupied capacity on the internal storage device 4 or the external storage devices 5 with respect to its logical capacity (a virtual volume having a low absolute occupied capacity or a virtual volume having a low occupancy ratio of the occupied capacity with respect to the logical capacity) is preferentially set as migration pair with a virtual volume in the data migration destination tier, and deficient virtual volumes are set as migration pairs with normal volumes. As a result, with the present storage system 1, since data migration to normal volumes is preferentially performed the lower the free space of a virtual volume, wasted logical capacity in the internal storage device 4 or the external storage devices 5 may be minimized.

In addition, the present embodiment is arranged such that the evaluation result is visually displayed according to a request from the user. Accordingly, information that will serve as useful reference to the user when editing a migration pair may be provided.

FIG. 30 shows a migration pair evaluation screen 80 that is displayed on the display unit 16 of the management server 7 in place of the migration plan creation screen 70, which has been described above with reference to FIG. 21, when the evaluate button 75 on the migration plan creation screen 70 is clicked. The migration pair evaluation screen 80 is a screen for providing the user with evaluation results of the remaining capacity of the data migration destination volume and the like with respect to each migration pair having a virtual volume as a data migration source, and includes: a "number" field 80A, a "volume name" field 80B, a "logical capacity" field 80C, an "occupied capacity on storage" field 80D, an "occupancy ratio" field 80E, an "evaluation value" field 80F and a "migration destination volume type" field 800.

Among these fields, a serial number is stored in the "number" field 80A, and a volume name of each virtual volume belonging to the migration group targeted at that point is stored in the "volume name" field 80B. In addition, the logical capacity of a corresponding virtual volume is stored in the "logical capacity" field 80C, while the occupied capacity (actually used capacity) of the virtual volume on the internal storage device 4 or the external storage devices 5 is stored in the "occupied capacity on storage" field 80D.

An occupancy ratio that is calculated as expressed by

[Formula 1]

$$\text{Occupancy ratio} = (\text{occupied capacity on storage device})/\text{logical capacity} \quad (1)$$

is stored in the "occupancy ratio" field 80E, while an evaluation value for calculating the free space of a virtual volume and which is calculated by a predetermined evaluation formula is stored in the "evaluation value" field 80F. In the case of the present embodiment, the evaluation formula is given as

[Formula 2]

$$\text{Evaluation value} = \text{logical capacity} \times (1 - \text{occupancy ratio}) \quad (2),$$

and an evaluation value of the virtual volume, calculated according to the evaluation formula, will be stored in the "evaluation value" field 80F. The evaluation value calculated by Formula (2) corresponds to the free space of the virtual volume.

A volume type of a data migration destination volume to which data stored in a corresponding virtual volume should be migrated, and which is determined based on the evaluation value of each virtual volume calculated by Formula (2) and the capacity of a virtual pool in a tier to be the data migration destination is stored in the "migration destination volume type" field 80G.

Accordingly, FIG. 30 shows that the logical capacity of a virtual volume denoted as "VV1" which belongs to the migration plan that is the target at that point is "50 GB", the occupancy capacity thereof on the internal storage device 4 or the external storage devices 5 is "10 GB", the occupancy ratio is "20%", the evaluated value is "40 GB", and that a volume type of "normal volume (NV)" is appropriate for the data migration destination volume.

Figure 31:
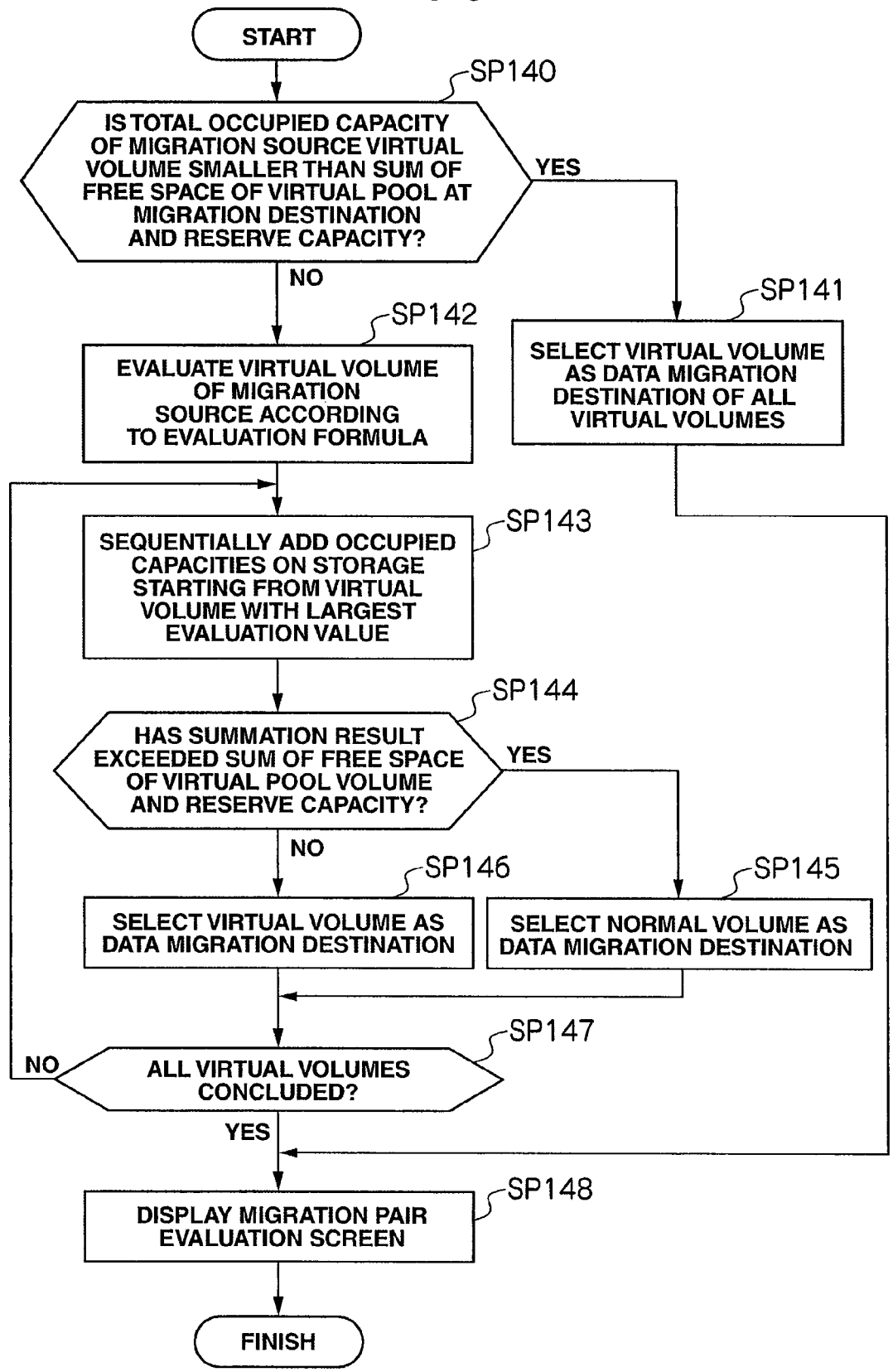
FIG. 31 is a flowchart for explaining migration plan evaluation processing.

FIG. 31 is a flowchart showing specific contents of processing performed by the CPU 12 of the management server 7 in relation to the displaying of such a migration pair evaluation screen 80 as described above.

When proceeding to step SP58 in the migration plan creation screen display processing described above with reference FIG. 22, the CPU 12 commences migration plan evaluation processing shown in FIG. 31 according to the migration plan creation program 24 (FIG. 2). The CPU 12 first references the volume information management table 30 (FIG. 4) and the virtual pool management table 38 (FIG. 12), and determines whether the total occupied capacity of the respective virtual volumes belonging to the migration group that is the data migration source on the internal storage device 4 or the external storage devices 5 is lower than the sum total capacity of the total free space of virtual pools belonging to the data migration destination tier and a predetermined reserve capacity (SP140).

Note that the reserve capacity is added to the total free space of the virtual pool as described above in order to prevent occurrences of disruption of business operations due to the inability to store new data into the virtual pool of the data migration destination in the event that the total occupied capacity of the virtual volumes that are the data migration source is equal to the total free space of the virtual pools of the data migration destination even when data stored in each virtual volume belonging to the migration volume that is the data migration source could be stored in the virtual pools belonging to the tier that is the data migration destination.

In this case, the size of the reserve capacity will be determined by what kind of evaluation formula will be used. For instance, when Formula (2) provided above is used as the evaluation formula, it is conceivable that around 10% of the capacity of the virtual pool will be applied as the reserve capacity. In addition, when using an occupancy ratio of the occupied capacity of the virtual volume on the internal storage device 4 or the external storage devices 5 with respect to its logical capacity, a capacity obtained by a summation of 5% of the occupancy capacities on the internal storage device 4 or the external storage devices 5 with respect to the logical capacities of the respective virtual volumes may conceivably be applied.

The present description will now return to FIG. 31. A positive result from the determination of step SP140 signifies that all data respectively stored in virtual volumes belonging to a migration group that is the data migration source may be stored in any of the virtual pools belonging to a tier that is the data migration destination. Accordingly, the CPU 12 respectively selects any of the virtual volumes in a corresponding tier as data migration destinations for all virtual volumes belonging to the migration group (SP141). The CPU 12 then generates a migration pair evaluation screen 80 corresponding to the selection result, causes the screen to be displayed on the display unit 16 of the management server 7 (SP148), and subsequently concludes migration plan evaluation processing.

On the other hand, a negative result from the determination of step SP140 signifies that all data respectively stored in virtual volumes belonging to the migration group that is the data migration source cannot be stored in the virtual pools belonging to the tier that is the data migration destination, and even if the data were to be stored, it is possible that business operations may not continue without disruption. Accordingly, the CPU 12 calculates an evaluation value for each virtual volume belonging to the migration group that is the data migration source according to Formula (2) (SP142).

Based on the evaluation values of respective virtual volumes calculated in step SP142, the CPU 12 selects the virtual volume that has the largest evaluation value (SP143), and determines whether the occupied capacity of the virtual volume on the internal storage device 4 or the external storage devices 5 exceeds the sum total of the total free space of virtual pools belonging to the data migration destination tier and the predetermined reserve capacity (SP144).

If the determination yields a positive result, the CPU 12 selects a normal volume in the tier as a migration destination of data stored in the virtual volume (SP145). On the other hand, if the determination of step SP144 yields a negative result, the CPU 12 selects a virtual volume in the tier as a migration destination of data stored in the virtual volume (SP146).

The CPU 12 next determines whether similar processing has been concluded for all virtual volumes belonging to the migration group that is the data migration source (SP147).

When the determination yields a negative result, the CPU 12 returns to SP143 to add the occupied capacity of the virtual volume that was initially selected and which has the largest evaluation value with the occupied capacity of a virtual volume that has the next largest evaluation value (SP143), and determines whether the sum total exceeds a sum total obtained by adding the reserve capacity to the total free space of virtual pools belonging to the tier that is the data migration destination (SP144).

If the determination yields a positive result, the CPU 12 selects a normal volume as the migration destination of data stored in the virtual volume for which occupied capacity has been added in step SP143 (SP145). On the other hand, if the determination of step SP144 yields a negative result, the CPU 12 selects a virtual volume in the tier as a migration destination of data stored in the virtual volume (SP146).

The CPU 12 repeats similar processing by sequentially replacing the virtual volume for which the occupied capacity is added in step SP143 to a virtual capacity having a larger evaluation value until similar processing is concluded for all virtual volumes belonging to the migration group that is the data migration source (SP143 to SP147-SP143).

When similar processing is concluded for all virtual volumes belonging to the migration group that is the data migration source, the CPU 12 generates a migration pair evaluation screen 80 based on selection results up to that point of steps SP145 and SP146, and displays the screen on the display unit 16 of the management unit 7 (SP148). The CPU 12 subsequently concludes migration plan evaluation processing.

(2-3-6) Function Regarding Prevention of Virtual Pool Capacity Depletion

As writing of data into a virtual volume progresses, the free space of a virtual pool to which the virtual volume is mapped (in other words, the virtual pool that dynamically allocates storage areas to the virtual volume) will eventually become depleted.

In consideration thereof, the present embodiment is arranged so that the management server 7 periodically verifies the free space of virtual pools in the internal storage device 4 or the external storage devices 5, and migration of data stored in virtual volumes mapped on virtual pools with low free space to normal volumes will either be suggested or automatically performed under the control of the management server 7.

More specifically, as shown in FIG. 32, when the occupancy ratio of an occupied capacity on the internal storage device 4 or the external storage devices 5 with respect to the logical capacity of a virtual pool exceeds a first specified value set by the user in advance (e.g. 80%), the management server 7 creates and displays a migration plan, such as that shown in FIG. 32, for migrating data stored in a virtual volume mapped on the virtual pool to a normal volume.

In addition, when the occupancy ratio of an occupied capacity on the internal storage device 4 or the external storage devices 5 with respect to the logical capacity of a virtual pool exceeds a second specified value (e.g. 98%) that is greater than the first specified value set by the user in advance, the management server 7 creates a migration plan for migrating data stored in the virtual pool to a normal volume, and executes automatic migration of data stored in the virtual pool to a normal volume according to the migration plan.

Figure 33:
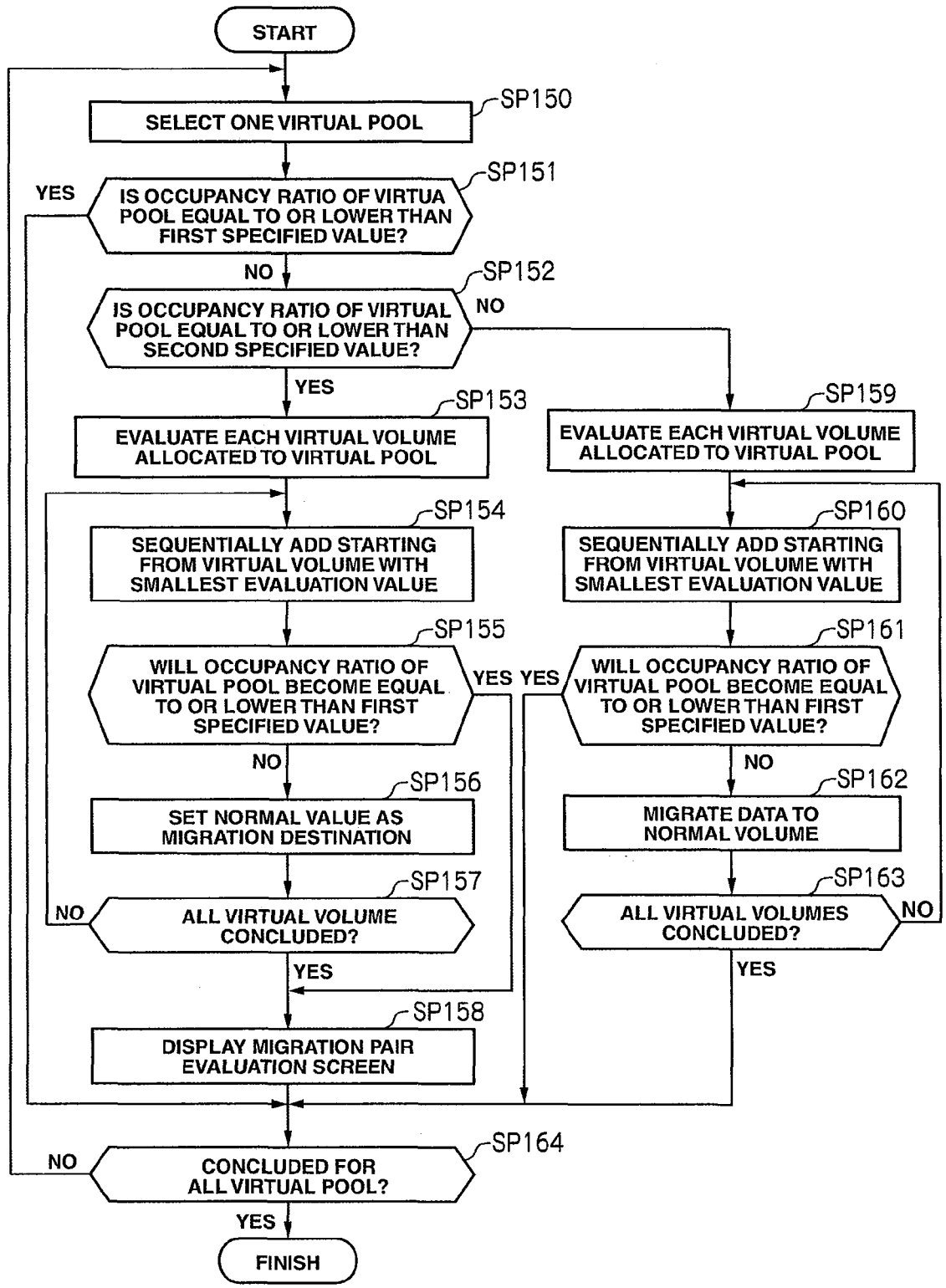
FIG. 33 is a flowchart for explaining processing of virtual pool capacity depletion prevention measures.

FIG. 33 is a flowchart showing specific contents of processing performed by the CPU 12 of the management server 7 in relation to the function of virtual pool capacity depletion prevention. According to the virtual pool depletion detection program 27 (FIG. 2), the CPU 12 periodically executes processing of virtual pool depletion prevention measures shown in FIG. 33.

More specifically, when a predetermined time lapses after the last execution of processing of virtual pool depletion prevention measures or upon arrival of a predetermined timing such as a prescribed time, the CPU 12 commences processing of virtual pool depletion prevention measures. The CPU 12 first selects a virtual pool from within the internal storage device 4 and the external storage devices 5 (SP150), and determines whether the occupancy ratio of the virtual pool is equal to or lower than a first specified value (SP151).

When the determination yields a positive result, the CPU 12 proceeds to step SP164. On the other hand, when the determination yields a negative result, the CPU 12 determines whether the occupancy ratio of the virtual pool is equal to or lower than a second specified value (SP152).

When the determination yields a positive result, the CPU 12 calculates the evaluation value of each virtual volume mapped on the virtual pool using the above-described Formula (2), and based on the respective calculated evaluation values, selects a virtual volume having the smallest evaluation value (SP154).

The CPU 12 calculates a new occupancy ratio using Formula (2) and setting a value obtained by subtracting the occupied ratio of the virtual volume selected in step SP154 from the occupied capacity of the virtual pool as the new occupied capacity of the virtual pool, and determines whether the occupancy ratio is equal to or lower than the first specified value (SP155).

When the determination yields a positive result, the CPU 12 proceeds to step SP158. On the other hand, when the determination yields a negative result, the CPU 12 selects and sets a normal volume as the migration destination of data stored in the virtual volume selected in step SP154 (SP156), and subsequently determines whether similar processing has been performed for all virtual volumes mapped to the virtual pool (SP157).

When the determination yields a negative result, the CPU 12 returns to step SP154 and adds the occupied capacity of the initially selected virtual volume having the smallest evaluation with the occupied capacity of a virtual volume having the next smallest evaluation volume (SP154).

The CPU 12 calculates an occupancy ratio using Formula (2) and setting a value obtained by subtracting the summation result of step SP154 from the occupied ratio of the target virtual volume at this point as the new occupied capacity, and determines whether the occupancy ratio is equal to or lower than the first specified value (SP155).

When the determination yields a positive result, the CPU 12 proceeds to step SP158. On the other hand, when the determination yields a negative result, the CPU 12 executes steps SP156 and SP157 in the same manner as described above by sequentially replacing the virtual volume for which the occupied capacity is added in step SP154 to a virtual volume having a smaller evaluation value (SP154 to SP157-SP154).

When the above processing is concluded for all virtual volumes mapped to the target virtual pool at that point, the CPU 12 creates a migration plan evaluation screen 80 that reflects the results of processing up to then, such as that shown in FIG. 32, and displays the same on the display unit 16 of the management server 7.

FIG. 32 shows an example suggesting that it is preferable to respectively migrate data stored in virtual volumes "VV2" and "VV3" that are mapped on a virtual pool "VP1" to normal volumes "NV1" and "NV2".

The CPU 12 determines whether similar processing has been performed for all virtual pools in the internal storage device 4 and the external storage devices 5 (SP164). If the determination yields a negative result, the CPU 12 returns to step SP150, and subsequently executes the same processing by switching target virtual pools (SP150 to SP164-SP150).

On the other hand, if a negative result is yielded by step SP152, the CPU 12 processes steps SP159 to SP161 in the same manner as steps SP153 to SP155. When the determination of step SP161 yields a positive result, the CPU 12 proceeds to step SP164. On the other hand, when the determination yields a negative result, the CPU 12 selects a normal volume for migrating the virtual volume selected in step SP160 (only initially) or to which an occupied capacity was last added in step SP160, and migrates data stored in the virtual volume to the normal volume (SP162).

The CPU 12 determines whether processing has been performed on all virtual volumes mapped to the target virtual pool at that point (SP163). If the determination yields a negative result, the CPU 12 returns to step SP160, and repeats the same processing by adding the occupied capacity of the virtual volume having the next smallest evaluation value to the summation result up to then until a positive result is yielded in step SP163 (SP160 to SP163-SP160).

Eventually, when processing is concluded for all virtual volumes mapped on the target virtual pool at that point, the CPU 12 determines whether the same processing has been performed for all virtual pools in the internal storage device 4 and the external storage devices 5 (SP164). If a negative result is yielded, the CPU 12 returns to step SP150 and subsequently repeats the same processing (SP150 to SP164-SP150).

When the same processing has been performed for all virtual pools in the internal storage device 4 and the external storage devices 5, the CPU 12 concludes the processing for virtual pool depletion prevention measures.

(2-3-7) Volume Creation/Data Migration Function

When migrating data stored in a volume to another volume, a data migration destination volume must be created in advance. In addition, when a plurality of virtual pools exists in a tier that is the data migration destination, it will not be easy to determine to which virtual pool should data stored in which virtual volume be migrated.

In consideration thereof, the present embodiment is arranged so that, when creating a migration plan, merely specifying the volume type of a volume that is the data migration destination in the migration pair information display field 77 in the migration plan creation screen 70 described above with reference to FIG. 21 will enable creation of a volume having the specified volume type and a required logical capacity in a corresponding internal storage device 4 or external storage devices 5 and execution of data migration under control of the management server. In this case, if a virtual volume is specified as the volume type of the data migration destination volume, the management server 7 maps the created virtual volume onto a virtual pool having the largest logical capacity in the tier. In addition, if the volume type of the data migration source is virtual volume, the management server 7 deletes the virtual volume from the internal storage device 4 or the external storage devices 5.

Figure 34:
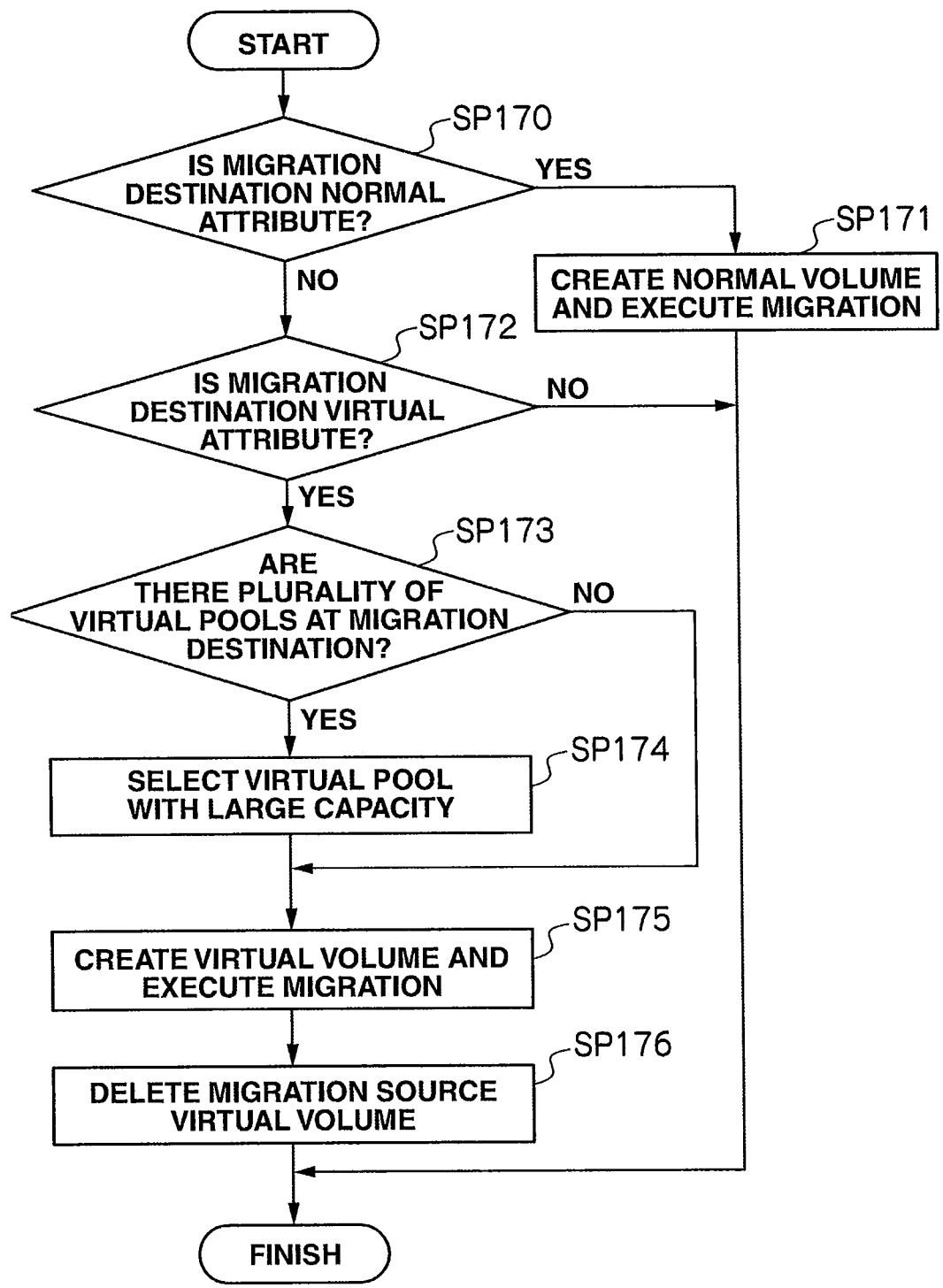
FIG. 34 is a flowchart for explaining volume creation and data migration processing.

FIG. 34 is a flowchart showing specific contents of processing performed by the CPU 12 of the management server 7 in relation to such volume creation and data migration. Upon execution of data migration, the CPU 12 executes volume creation and data migration processing shown in FIG. 34 according to the volume creation program 28 (FIG. 2) and the migration execution program 25 (FIG. 2).

More specifically, when performing data migration according to a migration plan, in the event that a migration pair exists for which a data migration destination volume has not been specified, the CPU 12 commences processing of volume creation and data migration shown in FIG. 34. The CPU first determines whether the volume type that is specified as the volume type of the data migration destination volume is normal volume based on the migration volume management table 35 (FIG. 9), the volume information management table 30 (FIG. 4) and the like (SP170).

When the determination yields a positive result, the CPU 12 creates a normal volume having the same logical capacity as the data migration source volume in the target tier at that point, migrates data from the data migration destination volume to the normal volume by controlling a corresponding internal storage device 4 or external storage device 5 (SP171), and subsequently concludes the processing of volume creation and data migration.

On the other hand, if the determination of step SP170 yields a negative result, the CPU 12 determines whether virtual volume is specified as the volume type of the data migration destination volume (SP172). If the determination yields a negative result, the CPU 12 concludes the processing of volume creation and data migration.

Meanwhile, if the determination of step SP172 yields a positive result, the CPU 12 determines whether a plurality of virtual pools exist in the data migration destination tier (SP173). When the determination yields a negative result, the CPU 12 proceeds to step SP175. On the other hand, when the determination yields a positive result, the CPU 12 selects the virtual pool with the largest logical capacity from the plurality of virtual pools (SP174).

The CPU 12 creates a virtual volume having the same logical capacity as the data migration source volume, maps the virtual volume onto a corresponding virtual pool, and migrates data from the data migration destination volume to the virtual volume by controlling a corresponding internal storage device 4 or external storage device 5 (SP175).

The CPU 12 then executes processing for deleting the virtual volume to which data migration had been performed from the management server 7 and the internal storage device 4 or the external storage devices 5 (SP176), and subsequently concludes the processing of volume creation and data migration.

(3) Advantages of the Present Embodiment

With the storage system 1 according to the present embodiment described above, by arranging total logical capacity, total occupied capacity on an internal storage device 4 or external storage devices 5, total logical capacities of unused volumes and the like to be displayed separately for normal volumes and virtual volumes in the summaries of migration groups and tiers, the user may immediately determine, by visual confirmation, how much capacity is required in the tier that becomes the data migration destination or whether the tier has sufficient capacity for migration of a volume of a migration group that is the data migration source. Consequently, the user will now be able to make appropriate decisions easily when selecting a data migration destination or the like, and in turn, a storage system with excellent usability may be achieved.

The present invention may be widely applied to storage systems with diverse configurations which are equipped with data migration functions that migrate data from one volume to another.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A management device that manages data migration between volumes in a storage system in which a normal volume and a virtual volume coexist as volume types of the volumes for reading and writing data, the normal volume being a volume to which a fixed storage area is allocated in advance and the virtual volume being a volume to which a storage area is dynamically allocated according to use status, wherein the management device comprises:
  a display unit that displays information; and
  a control unit that collects information regarding the volumes, and based on the collected information, causes the display unit to separately display, for the normal volume and the virtual volume, at least a total logical capacity of the normal volume and a total logical capacity of the virtual volume, each of the total logical capacities being a summation of logical capacities that include an unallocated capacity, and causes the display unit to display, when the volume types of a data migration source volume and a corresponding data migration destination volume are different from each other, specific information indicating the volume types are different from each other,
  wherein the control unit causes the display unit to display a migration plan creation screen including a first field for designating a migration group and a second field for designating a tier, and creates a migration pair between each volume as the data migration source volume that belongs to the migration group input in the first field and any of volumes as the data migration destination volume within the tier input in the second field, and
  wherein the control unit causes the display unit to display volume names, which indicates each of the data migration source volumes and each of the corresponding data migration destination volumes, the data migration status of the created migration pair, the volume types of the migration pair, logical capacities of the migration pair, and an occupied capacity of the data migration source volume.

2. The management device according to claim 1, wherein the control unit causes the display unit to display information indicating whether or not the data migration regarding the migration pair is temporary, in addition to the volume names, the data migration status, the volume types, the logical capacities, and the occupied capacity.

3. The management device according to claim 1, wherein the control unit principally creates a migration pair so that the volume types and the logical capacities of the data migration source volumes and the data migration destination volumes are identical to each other, and
  wherein the control unit causes the display unit to preferentially display the migration pair information of the migration pair, in which the volume types of the data migration source volumes and the data migration destination volumes are identical to each other, over another migration pair information of another migration pair including different volume types of the data migration source volumes and the data migration destination volumes, if the control unit cannot creates the migration pair so that the volume types and logical capacities of the data migration source volumes and the data migration destination volumes are identical to each other.

4. The management device according to claim 3, wherein the control unit selects the normal volume as the data migration source volume if the data migration source volume is the virtual volume having less space than a predetermined capacity.

5. The management device according to claim 1, wherein the control unit causes the display unit to display migration pair information of a migration pair including the volume type and logical capacities of the data migration source volume and the corresponding data migration destination volume in a row and to display another migration pair information of another migration pair in another row on the migration plan creation screen.

6. The management device according to claim 1, wherein the control unit causes the display unit to display migration pair information corresponding to a migration pair in which the data migration source volume is a virtual volume and free space of the virtual volume as the data migration source volume is less than or equal to a predetermined value, in a location next to another migration pair information corresponding to a migration pair including an identical volume type and logical capacities of the data migration source volume and the corresponding data migration destination volume, and to display an announcement to bring attention to the data migration status regarding the migration pair.

7. A management device that manages data migration between volumes in a storage system in which a normal volume and a virtual volume coexist as volume types of the volumes for reading and writing data, the normal volume being a volume to which a fixed storage area is allocated in advance and the virtual volume being a volume to which a storage area is dynamically allocated according to use status, wherein the management device comprises:
  a display unit that displays information; and
  a control unit that collects information regarding the volumes, and based on the collected information, causes the display unit to separately display, for the normal volume and the virtual volume, at least a total logical capacity of the normal volume and a total logical capacity of the virtual volume, each of the total logical capacities being a summation of logical capacities that include an unallocated capacity, and causes the display unit to display, when the volume types of a data migration source volume and a corresponding data migration destination volume are different from each other, specific information indicating the volume types are different from each other,
  wherein the control unit causes the display unit to display a migration plan creation screen including a first field for designating a migration group and a second field for designating a tier, and creates a migration pair between each volume as the data migration source volume that belongs to the migration group input in the first field and any of volumes as the data migration destination volume within the tier input in the second field, and
  wherein the control unit causes the display unit to display a migration pair, in which the volume types of the data migration source volume and the corresponding data migration destination volume are different from each other, with an announcement of warning displayed as the data migration status regarding the migration pair.

8. A management method for managing data migration between volumes in a storage system in which normal and virtual volumes coexist as volume types of the volumes for reading and writing data, the normal volume being a volume to which a fixed storage area is allocated in advance and the virtual volume being a volume to which a storage area is dynamically allocated according to use status, the management method comprising:

a first step for collecting information regarding the volumes, and a second step for separately displaying, based on the collected information, for the normal volume and the virtual volume, at least a total logical capacity of the normal volume and a total logical capacity of the virtual volume, each of the total logical capacities being a summation of logical capacities that include an unallocated capacity, and displaying, when the volume types of a data migration source and a corresponding data migration destination volume are different from each other, specific information indicating the volume types are different from each other, wherein the second step includes displaying a migration plan creation screen with a first field for designating a migration group and a second field for designating a tier shown in the migration group input in the first field and any of volumes as the data migration destination volume within the tier input in the second field, and wherein the second step includes displaying volume names on the migration plan creation screen, which indicates each of the data migration source volumes and each of the corresponding data migration destination volumes, the data migration status of the created migration pair, the volume types of the migration pair, logical capacities of the migration pair, and an occupied capacity of the data migration source volume.

9. The management method according to claim 8, wherein the second step includes displaying information, on the migration plan creation screen, indicating whether or not the data migration regarding the migration pair is temporary, in addition to the volume names, the data migration status, the volume types, the logical capacities and the occupied capacity.

10. The management method according to claim 8, wherein the second step includes principally creating a migration pair so that the volume types and the logical capacities of the data migration source volumes and the data migration destination volumes are identical to each other, wherein the migration plan creation screen is preferentially displayed with the migration pair information of the migration pair, in which the volume types of the data migration source volumes and the data migration destination volumes are identical to each other, over another migration pair information of another migration pair including different volume types of the data migration source volumes and the data migration destination volumes, if the migration pair cannot be not created so that the volume types and logical capacities of the data migration source volumes and the data migration destination volumes are identical to each other.

11. The management method according to claim 10, wherein the second step includes selecting the normal volume as the data migration source volume if the data migration source volume is the virtual volume having less space than a predetermined capacity.

12. The management method according to claim 8, wherein the second step includes displaying migration pair information of a migration pair including the volume type and the logical capacities of the data migration source volume and the data migration destination volume in a row and displaying another migration pair information of another migration pair in another row on the migration plan creation screen.

13. The management method according to claim 8, wherein the second step includes displaying migration pair information corresponding to a migration pair in which the data migration source volume is a virtual volume and free space of the virtual volume as the data migration source volume is less than or equal to a predetermined value, located in a location next to another migration pair information corresponding to a migration pair including an identical volume type and logical capacities of the data migration source volume and the data migration destination volume on the migration plan creation screen, and displaying an announcement to bring attention to the data migration status regarding the migration pair on the migration plan creation screen.

14. The management method according to claim 8, wherein the second step includes displaying a migration pair, in which the volume types of the data migration source volume and the corresponding data migration destination volume are different from each other, with an announcement of warning displayed as the data migration status regarding the migration pair on the migration plan creation screen.

* * * * *